United States Patent
Yoshida

(10) Patent No.: US 6,833,855 B2
(45) Date of Patent: Dec. 21, 2004

(54) MULTI-BEAM SCANNING OPTICAL SYSTEM WITH REDUCED INTERBEAM DISPLACEMENT AND IMAGE FORMING APPARATUS USING THE SAME

(75) Inventor: Hiroki Yoshida, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 10/115,091

(22) Filed: Apr. 4, 2002

(65) Prior Publication Data

US 2002/0154208 A1 Oct. 24, 2002

(30) Foreign Application Priority Data

Apr. 24, 2001 (JP) ........................................ 2001-125712

(51) Int. Cl.[7] .......................... B41J 15/14; B41J 27/00; B41J 2/435
(52) U.S. Cl. ....................... 347/241; 347/235; 347/250; 347/256
(58) Field of Search ................................. 347/235, 241, 347/250, 256, 137, 232, 234, 132, 236, 246, 248; 250/234; 359/216

(56) References Cited

U.S. PATENT DOCUMENTS

| | | | | |
|---|---|---|---|---|
| 5,365,259 A | * | 11/1994 | Kanoto et al. | 347/137 |
| 5,412,408 A | * | 5/1995 | Itoh et al. | 347/132 |
| 5,963,356 A | * | 10/1999 | Kato | 359/216 |
| 6,194,713 B1 | * | 2/2001 | Kanazawa | 250/234 |
| 6,362,470 B1 | | 3/2002 | Yoshida et al. | 250/235 |
| 6,476,955 B1 | | 11/2002 | Yoshida | 359/204 |

FOREIGN PATENT DOCUMENTS

JP 9-54263 2/1997

* cited by examiner

Primary Examiner—Hai Pham
(74) Attorney, Agent, or Firm—Fitzpatrick, Cella, Harper & Scinto

(57) ABSTRACT

A multi-beam scan optical system and an image forming apparatus using the same are provided in which high-quality printing can be realized at high speed with a relatively simple construction. The multi-beam scanning optical system comprises an entrance optical unit for introducing, to a deflecting unit, a plurality of light beams emitted from a light source unit having a plurality of light emitting portions arranged apart from each other at least in a main scan direction; a scanning optical unit for focusing the plurality of light beams deflected by the deflecting unit on a surface to be scanned; and a synchronous detection optical unit for converging, by a synchronous detection lens unit, parts of the plurality of light beams deflected by the deflecting unit on a plane of a slit, introducing the parts of the plurality of light beams to a synchronous detection sensor, and controlling timing of scan start positions on the surface to be scanned with respect to the plurality of light beams by using signals from the synchronous detection sensor. The focal distance of the scanning optical unit differs from the focal distance of the synchronous detection lens unit, and a predetermined conditional formula (A) is satisfied.

28 Claims, 16 Drawing Sheets

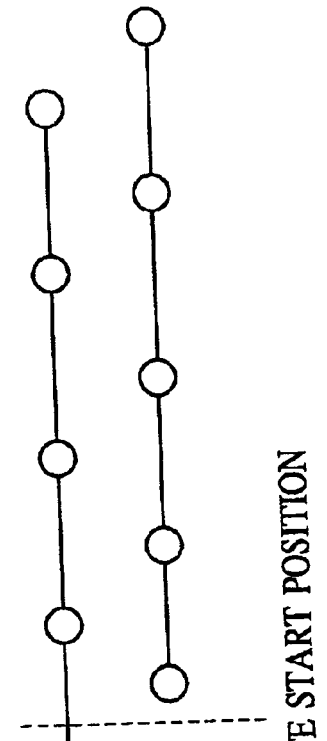
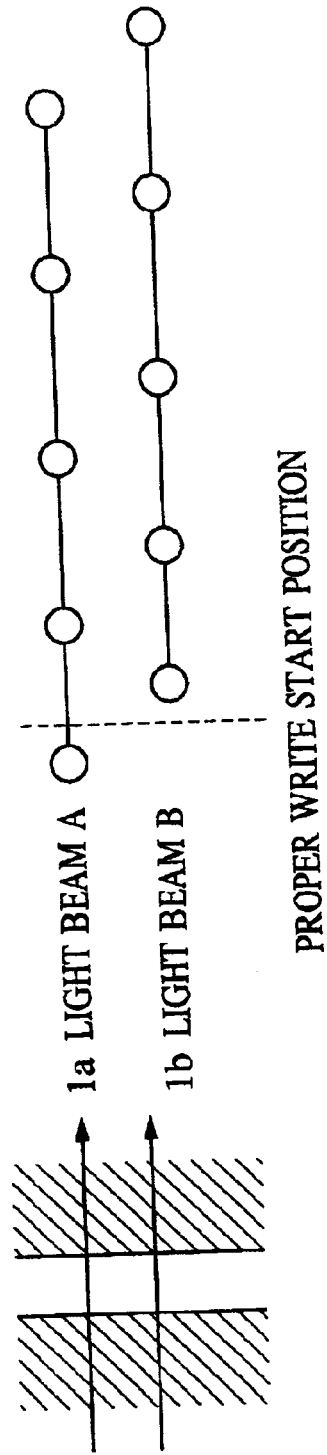
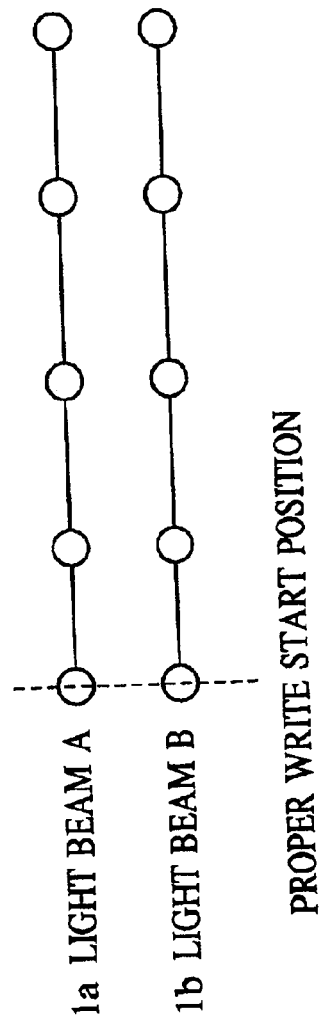
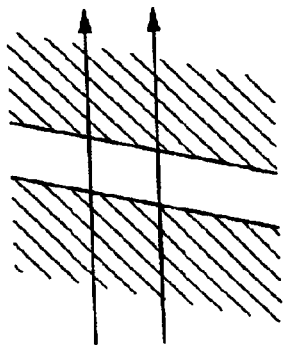

FIG. II
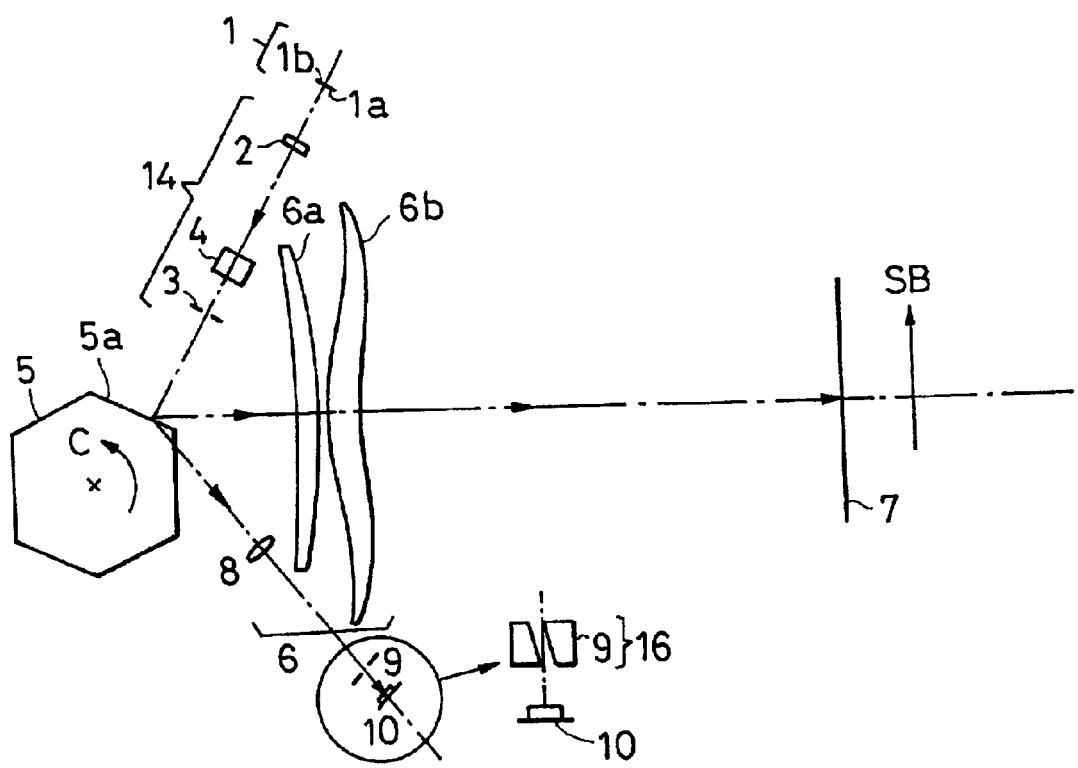

FIG. 19A  FIG. 19B
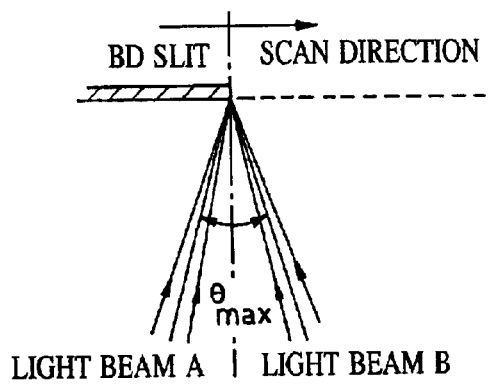
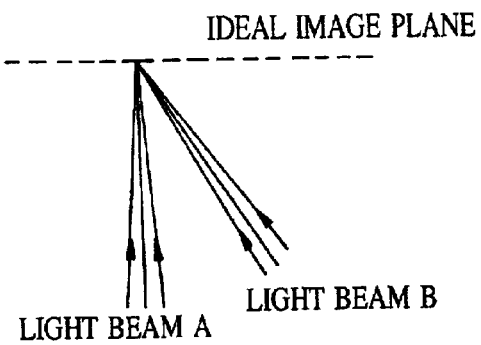
FIG. 20A  FIG. 20B
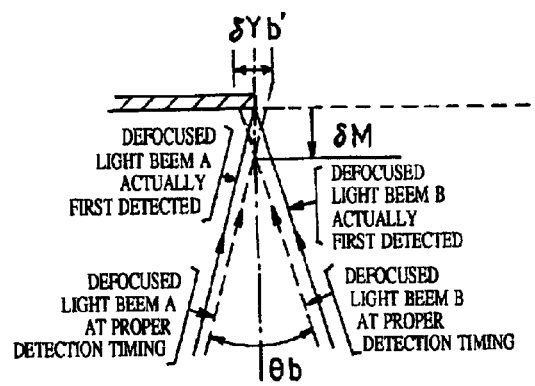
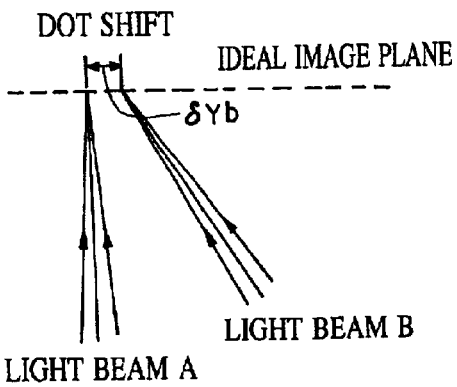

FIG. 23A    FIG. 23B
CASE OF ONLY HEIGHT OF BD IMAGE BEING OUT OF FOCUS
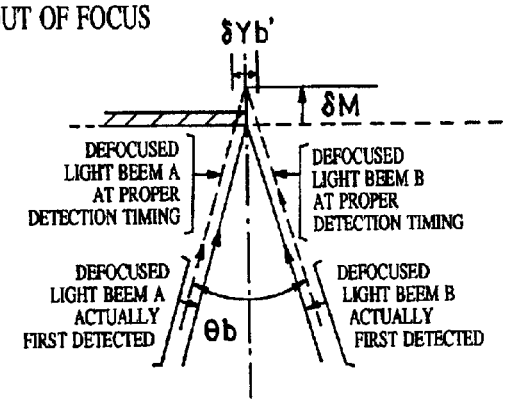
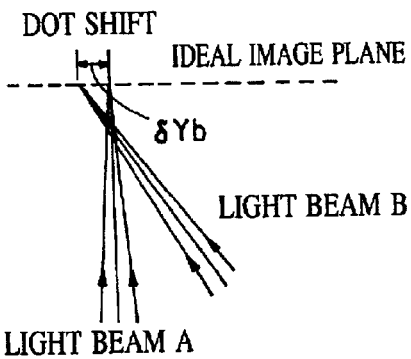
FIG. 24A    FIG. 24B
CASE OF DEFOCUSING IN PRINTING AREA
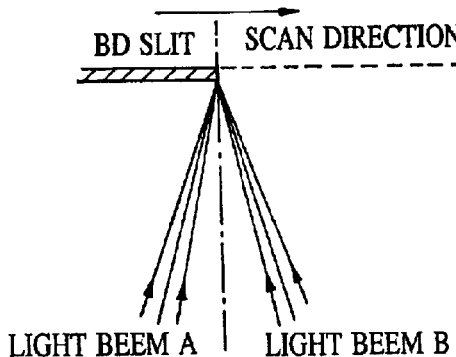
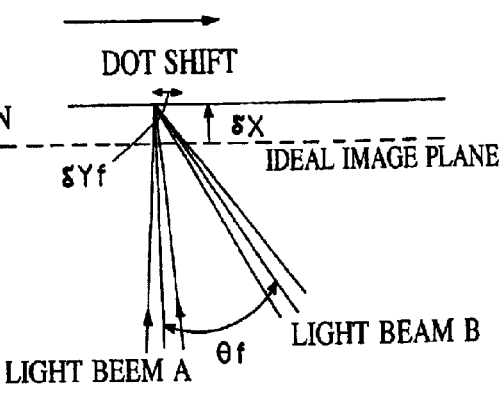

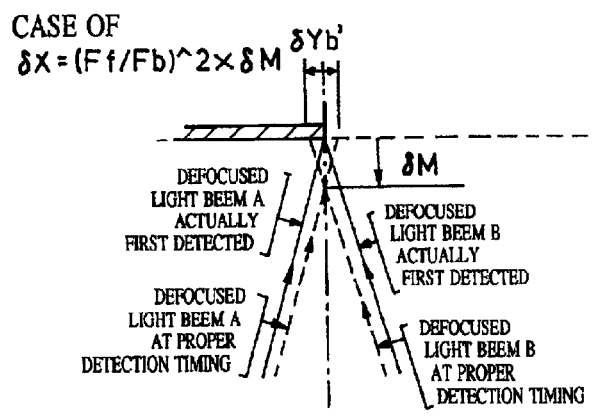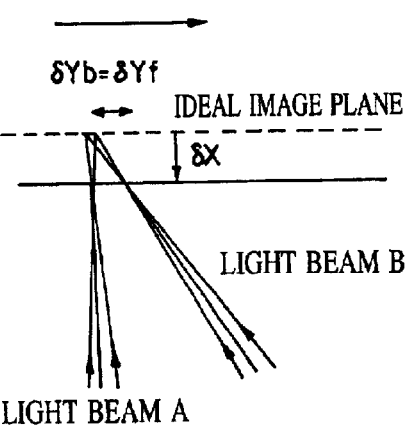
FIG. 25A  FIG. 25B
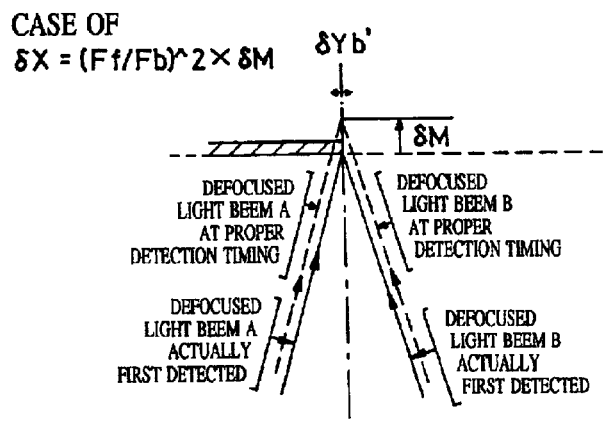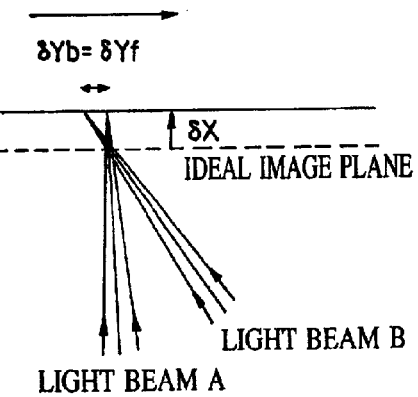
FIG. 26A  FIG. 26B

MULTI-BEAM SCANNING OPTICAL SYSTEM WITH REDUCED INTERBEAM DISPLACEMENT AND IMAGE FORMING APPARATUS USING THE SAME

BACKGROUND OF THE INVENTION

1. Field of the Invention

The present invention relates to a multi-beam scanning optical system and an image forming apparatus using the same. More particularly, the present invention is suitably implemented as an image forming apparatus, such as a laser beam printer and a digital copying machine, in which high-quality printing can be realized at high speed with a relatively simple construction.

2. Description of the Related Art

Hitherto, a scanning optical system used in an image forming apparatus, e.g., a laser beam printer and a digital copying machine, has such a construction that a light beam emitted from a light source is introduced to a deflecting unit through an entrance optical system, and the light beam deflected by the deflecting unit is focused by a scanning optical system into the form of a spot on a photoconductor drum surface, i.e., a surface to be scanned, thereby optically scanning the photoconductor drum surface with the light beam.

With recent improvements in performance and function of an image forming apparatus, a demand for operation at higher speed has increased more and more. One solution of meeting such a demand is to employ a plurality of light sources. For example, Japanese Patent Laid-Open No. 9-54263 proposes a multi-beam scanning optical system in which a light source is constituted as a multi-beam laser chip radiating, from one chip, a plurality of laser beams focused into spots lying on a line.

In that multi-beam scanning optical system, an optical means for beam synchronous detection (BD optical system) is usually disposed just upstream of a stage of writing an image signal for precise control of an image-write start position.

FIG. 18 is a sectional view (main scan section view) of principal part of a conventional multi-beam scanning optical system in the main scan direction. Referring to FIG. 18, numeral 51 denotes a light source unit comprising two light emitting portions (light sources) constituted by, e.g., semiconductor lasers. The two light emitting portions are separately arranged from each other in both the main scan direction and the sub-scan direction. Numeral 52 denotes an aperture diaphragm for shaping each of light beams emitted from the two light emitting portions into an optimum beam shape. Numeral 53 denotes a collimator lens for converting the light beams having passed the aperture diaphragm 52 into substantially parallel light beams. Numeral 54 denotes a cylindrical lens that has predetermined refracting power only in the sub-scan direction. The above-mentioned elements, such as the aperture diaphragm 52, the collimator lens 53 and the cylindrical lens 54, constitute respective components of an entrance optical system 62.

Numeral 55 denotes a deflecting unit (optical deflector) that is constituted by a rotating polygon mirror, for example, and is rotated at a constant speed in a direction of arrow PA, shown in FIG. 18, by a driving unit (not shown) such as a motor. Numeral 56 denotes a scanning optical system 56 that has the fθ characteristic and comprises two first and second fθ lenses. The scanning optical system 56 has the function of compensating an image plane tilt by holding, in a sub-scan section, a conjugate relationship between the vicinity of a deflecting surface 55a of the optical deflector 55 and the vicinity of a photoconductor drum surface 57 as a surface to be scanned.

Numeral 58 denotes a return mirror (referred to as a "BD mirror" hereinafter) for reflecting, toward the side of a synchronous detection sensor 61 (described later), a plurality of light beams (referred to as "BD light beams" hereinafter) used for detecting sync signals to adjust the timing of scan start positions on the photoconductor drum surface 57. Numeral 59 denotes a slit (referred to as a "BD slit" hereinafter) that is provided in a position optically equivalent to the photoconductor drum surface 57. Numeral 60 denotes a BD lens for making the BD mirror 58 and the synchronous detection sensor 61 located in a conjugate relationship and for compensating a plane tilt of the BD mirror 58. Numeral 61 denotes a photosensor (referred to as a "BD sensor" hereinafter) serving as the synchronous detection sensor 61. The above-mentioned elements, such as the return mirror 58, the BD slit 59, the BD lens 60 and the BD sensor 61, constitute respective components of an optical means for beam synchronous detection (BD optical system).

With the arrangement of FIG. 18, beam synchronous detection is performed for each of the BD light beams emitted from the two light emitting portions, and the timing of a scan start position in recording of an image on the photoconductor drum surface 57 is adjusted for each light beam emitted from the light emitting portion by using an output of the BD sensor 61.

In a multi-beam scanning optical system including a plurality of light emitting portions (light sources), however, if the relative positional relationship between respective light beams emitted from the plurality of light sources in the main scan direction is changed on a surface to be scanned with the progress of scan for various reasons, degradation of a printed image occurs. Also, in spite of that the relative positional relationship between the light emitting portions in the main scan direction is not changed during scan, degradation of a printed image also occurs if write start positions are shifted from each other between the light emitting portions.

Such a phenomenon is conceivably caused by a shift of focus position of the BD light beam on the plane of a BD slit (namely, the BD light beam is not properly focused because it is out of focus on the plane of the BD slit) and a shift of focus position of the scanning light beam on the surface to be scanned.

A shift of focus position of the BD light beam on the BD slit plane will be described below with reference to FIGS. 19 to 26. Note that, for the sake of clearer representation, the BD sensor that should be illustrated on the upper side in the figure is omitted from all of FIGS. 19 to 26. Also, marginal rays are omitted in FIGS. 20A, 23A, 25A and 26A.

FIG. 19A shows a state at the moment when two light beams (herein, a light beam A emitted from one light emitting portion and a light beam B emitted from the other light emitting portion) are focused just at one end (right end as viewed on the figure) of the BD slit in the main scan direction. The light beam A scanned from the left to the right in FIG. 19A does not enter the BD sensor until it reaches just the right end of the BD slit. Upon the light beam A reaching the right end of the BD slit, the BD sensor outputs a signal indicating the incidence of the light beam A. Similarly to the light beam A, the light beam B scanned from the left to the right does not enter the BD sensor until it reaches just the right end of the BD slit, and the BD sensor outputs a signal indicating the incidence of the light beam B upon reaching the right end of the BD slit. The timing of write start positions of the light beams A, B is adjusted by detecting the timed relationship between the two output signals from the BD sensor.

However, if the focus positions of the light beams A, B having passed the BD optical system are relatively shifted δM, as shown in FIG. 20A, in the main scan section to the upstream side looking from the slit, i.e., to the side nearer to the deflecting unit, the following phenomenon occurs and the write start positions of the light beams A, B are shifted from each other. More specifically, at the timing at which the light beam A should be focused at the right end of the BD slit and should start entering the BD sensor unless the light beam A is not defocused, the light beam A already enters the surface of the BD sensor because of defocusing (namely, the defocused light beam A at the proper detection timing in this case is indicated by a broken line on the left side in FIG. 20A). The light beam A actually starts entering the BD sensor at the timing when it has reached a position indicated by a solid line on the left side in FIG. 20A (as represented by "defocused light beam A actually first detected"). Thus, the write start timing of the light beam A is advanced corresponding to a shift between the broken line and the solid line on the left side. Conversely, the light beam B should start entering the BD sensor at the timing when it has reached a position indicated by a broken line on the right side in FIG. 20A (as represented by "defocused light beam B at proper detecting timing"), but it cannot enter the BD sensor at that timing because of defocusing. The light beam B is able to actually enter the BD sensor only after it has reached a position indicated by a solid line on the right side in FIG. 20A (as represented by "defocused light beam B actually first detected"). Thus, the write start timing of the light beam B is delayed corresponding to a shift between the broken line and the solid line on the right side. As a result, the relative write start positions of the light beams A, B are shifted depending on the distance between the two broken lines on the plane of the BD slit. A relative write start position shift δYb occurred on the surface to be scanned at that time is determined as follows.

A distance δYb' between the two broken lines on the plane of the BD slit is determined based on a focus shift amount δM measured looking from the slit plane and an angle difference θb [rad] between incident angles of the two light beams when they have reached the right end of the slit. Then, the distance δYb' can be approximately expressed by:

$$\delta Yb' = \delta M \times \theta b \tag{1}$$

Herein, the angle difference θb between incident angles of the two light beams is attributable to the fact that deflecting points of the light beams A, B are shifted from each other when they are deflected by the deflecting surface, and is caused due to the fact that the two light beams pass different areas of a lens unit for focusing the light beams, after being deflected by the deflecting surface, to the vicinity of the slit plane in the main scan section.

If the relative position shift δYb' on the slit plane occurs between the light beams A and B as described above, an angle φ by which the deflecting unit (deflecting surface) is rotated during a period from the incidence of the light beam A upon the BD sensor to the time at which the light beam B starts entering the BD sensor is increased, as expressed by the following formula (2), in comparison with the case that the BD optical system is free from defocusing:

$$\phi = \operatorname{Arctan}((\delta Yb'/2)/Fb) \tag{2}$$

In the formula (2), Fb is the focal distance of the lens unit for focusing the light beams, after being deflected by the deflecting surface, to the vicinity of the slit plane in the main scan section, and it is usually greater than δYb' on the order of two digits. Therefore, the formula (2) can be approximately expressed by:

$$\phi = 0.5 \times \delta Yb'/Fb \tag{3}$$

Because the scanning optical system has the fθ characteristic, the relative write start position shift δYb on the surface to be scanned is given by the following formula (4) on an assumption that the focal distance of the scanning optical system is Ff:

$$\delta Yb = 2 \times Ff\phi = (Ff/Fb) \times \delta Yb' = (Ff/Fb) \times (\delta M \times \theta b) \tag{4}$$

Thus, the write start position shift δYb is given by a value resulting from multiplying the relative position shift δYb' on the BD slit plane by a lateral magnification ratio (Ff/Fb) between the synchronous detection optical system and the scanning optical system.

If the focus position is shifted from the slit plane in the synchronous detection optical system, a scanning line provided by the light beam A and a scanning line provided by the light beam B are shifted from each other, as described above, in the main scan direction by an amount of δYb expressed by the formula (4). On the other hand, if the focus position is shifted δX to the side nearer to the deflecting unit looking from the surface to be scanned, as shown in FIG. 21, in spite of the synchronous detection optical system being free from defocusing, a point of intersection between the light beams A and B is shifted δX to the side nearer to the deflecting unit. In that case, therefore, there occurs a relative position shift δYf between the light beams A and B in the main scan direction (such a phenomenon, including the above-mentioned write start position shift, is referred to as a "dot position shift" hereinafter). The relative dot position shift δYf is determined as described below with reference to FIG. 21. Note that since the dot position shift occurs depending on defocusing of each image height in a scan area looking from the surface to be scanned, the dot position shift amount is generally not constant due to an effect of curvature of the image plane, etc.

FIGS. 21A and 21B show the positional relationship between two light beams (herein light beams A and B) at the moment when the light beams A and B are going to print images at the same height while they are defocused by a distance δX toward the upstream side, i.e., the side nearer to the deflecting unit, looking from the surface to be scanned. In this case, because the focus position is shifted by the distance δX, the focuses of the two light beams are aligned with each other at a position spaced by the distance δX from the surface to be scanned. However, the surface to be scanned is in fact apart by the distance δX from the aligned focus position toward the downstream side, and hence a relative position shift between the light beams A and B is approximately expressed by;

$$\delta Yf = \delta X \times \theta f \tag{5}$$

where θf [rad] represents an angle difference between incident angles of the light beams A and B upon the surface to be scanned when they reach a certain image height.

Accordingly, a dot position shift δY, taking into account both the focus shift δYb caused by the synchronous detection optical system and the focus shift δYf caused by the scanning optical system, is expressed by:

$$\delta Y = \delta Yf - \delta Yb = \delta X \times \theta f - (Ff/Fb) \times \delta M \times \theta b \quad (6)$$

The signs of δYf and δYb on the right side of the formula (6) differ from each other for the reason given below. When the light beam is defocused toward the upstream side due to the synchronous detection optical system, the write start position of a scanning line provided by the light beam A is shifted in a direction to locate ahead with respect to the write start position of a scanning line provided by the light beam B. On the other hand, When the light beam is defocused toward the upstream side due to the scanning optical system, the write start position of the light beam B is shifted in a direction to locate ahead with respect to the write start position of the light beam A.

Further, the incident angle differences θf and θb can be approximated as follows, assuming that d represents a position shift amount on the reflecting surface between the light beams A and B in the main scan direction when the reflecting surface is positioned in a face-to-face relation to the light sources:

$$\theta b = d/Fb \quad (7a)$$

$$\theta f = d/Ff \quad (7b)$$

Accordingly, the formula (6) can be modified to:

$$\delta Y = [(Fb/Ff) \times \delta X - (Ff/Fb) \times \delta M] \times \theta b \quad (8a)$$

or $$\delta Y = [\delta X - (Ff/Fb)^2 \times \delta M] \times \theta f \quad (8b)$$

Although the above description is made on the premise that there are two light sources, the discussion is similarly applied to the case in which there are three or more light sources in practice. A maximum shift amount δYtotal among dot position shifts δY between respective light emitting portions is given as follows, assuming that a maximum angle difference between the incident angles of the light beams upon the slit plane is θmax [rad]:

$$\delta Ytotal = [(Fb/Ff) \times \delta X - (Ff/Fb) \times \delta M] \times \theta max \quad (9)$$

Hence, assuming that a maximum value among allowable dot position shifts δY between respective scanning lines is δYmax, the multi-beam scanning optical system requires to be arranged so that the focus shift amounts δM and δX satisfy the following formula (10):

$$|(Fb/Ff) \times \delta X - (Ff/Fb) \times \delta M| \leq \delta Ymax/\theta max \quad (10)$$

Incidentally, when the multi-beam scanning optical system is arranged so as to satisfy the formula (10), the best spot position may be shifted from the position of the surface to be scanned in some cases. However, image quality is hardly affected so long as the focus position is within the allowable depth range.

Also, the maximum value δYmax of the dot position shift is preferably not larger than about a half the resolution in the sub-scan direction. If the maximum value δYmax exceeds such a level, adjacent horizontal lines would appear shifted from each other and a printed result would be very unsightly.

Given δYmax=10.5 μm (corresponding to a half dot of 1200 dpi), θmax=0.3 [deg], Ff=140 mm, and Fb=70 mm, for example, δX is given by;

$$\delta X \leq 4.0 \text{ mm}$$

in the case of δM=0, and δM is given by;

$$\delta M \leq 1.0 \text{ mm}$$

in the case of δX=0.

Although the above description is made of the case in which the focus position is shifted to the upstream side of the BD slit, the discussion is similarly applied to the case in which the focus position is shifted to the downstream side of the BD slit, as seen from FIGS. 22 to 26.

FIGS. 22A and 22B are explanatory views showing a reference state for explaining the positional relationship between two light beams when the focus position is shifted to the downstream side (i.e., the side away from the deflecting unit). FIGS. 23A and 23B are explanatory views showing the positional relationship between two light beams when the focus position is shifted to the downstream side (i.e., the side away from the deflecting unit) relative to the BD slit, and FIGS. 24A and 24B are explanatory views showing the positional relationship between two light beams when the focus position is shifted to the downstream side (i.e., the side away from the deflecting unit) relative to the surface to be scanned. FIGS. 25A and 25B are explanatory views showing the positional relationship between two light beams when the focus position is shifted to the upstream side (i.e., the side nearer to the deflecting unit) relative to the BD slit and the surface to be scanned, and FIGS. 26A and 26B are explanatory views showing the positional relationship between two light beams when the focus position is shifted to the downstream side (i.e., the side away from the deflecting unit) relative to the BD slit and the surface to be scanned.

Further, when the incident angles of the light beams upon the surface to be scanned are exactly the same, θmax=0 is resulted because the incident angles upon the BD slit are also all equal to each other from the formula (7). Accordingly, as seen from the formula (9), there occurs no dot position shift due to the focus position shift. However, such a condition is established only when the light emitting portions are arranged with no shift in the main scan direction, i.e., when the light emitting portions are arranged to lie on a line in the sub-scan direction, or only when a diaphragm or a conjugate point of a diaphragm is arranged on the deflecting surface so that principal rays of the light beams cross each other on the deflecting surface.

The former case gives rise to problems as follows. When the light emitting portions are arranged with no shift in the main scan direction, in particular, when a magnifying system is included in the sub-scan direction, the distance between the light emitting portions becomes usually too short on the order of several μm to ten and odds μm (the distance therebetween in an ordinary commercially available multi-laser is about 100 μm). Therefore, crosstalk occurs and the light emitting portions generate light in different amounts. As a result, stable oscillation is no longer ensured and the useful life is shortened.

The latter case gives rise to problems as follows. When arranging a diaphragm on the deflecting surface, a desired condition can be obtained by causing the deflecting surface to provide in itself the function as a diaphragm without placing any member corresponding to a diaphragm at least in the main scan direction. With that arrangement, however, the width of a light beam is changed as deflecting scan proceeds, thus resulting in disadvantages that the spot diameter is changed and the amount of light is also changed. Further, using a relay optical system is known as a method for providing a conjugate point of a diaphragm on the deflecting surface. However, the method using a relay optical system is disadvantageous in that the number of necessary optical elements is increased and effectiveness in both space and cost is deteriorated.

Further, for a multi-beam scanning optical system including no BD slit in the BD optical system, an edge of the BD sensor eventually plays as the role of the BD slit. Therefore, the above discussion is similarly applied by replacing the right end of the BD slit with the left end of an effective area of the BD sensor and the plane of the BD slit with the light receiving surface of the BD sensor, respectively, in the above description.

In addition, while the scan direction is described above as directing from the left to the right, the above discussion is also similarly applied to the case in which the scan direction is reversed, except that the timing of deciding the write start position is changed from the right end of the illustrated BD slit to the left end of a not-shown BD slit on the right side.

SUMMARY OF THE INVENTION

Accordingly, it is an object of the present invention to provide a multi-beam scanning optical system and an image forming apparatus using the same, in which high-quality printing can be realized at high speed with a relatively simple construction.

According to one aspect of the present invention, there is provided a multi-beam scanning optical system comprising an entrance optical unit for introducing, to a deflecting unit, a plurality of light beams emitted from a light source unit having a plurality of light emitting portions arranged apart from each other at least in a main scan direction; a scanning optical unit for focusing the plurality of light beams deflected by the deflecting unit on a surface to be scanned; and a synchronous detection optical unit for converging, by a synchronous detection lens unit, parts of the plurality of light beams deflected by the deflecting unit on a plane of a slit, introducing the parts of the plurality of light beams to a synchronous detection sensor, and controlling timing of scan start positions on the surface to be scanned with respect to the plurality of light beams by using signals from the synchronous detection sensor, wherein, assuming that a focal distance of the scanning optical unit is Ff, a focal distance of the synchronous detection lens unit is Fb, a focus position shift amount of each light beam introduced to the synchronous detection sensor in a main scan section is $\delta M1$ looking from the slit, a focus position shift amount of each image height is $\delta X$ looking from the surface to be scanned, an allowable dot position shift amount of each scanning line is $\delta Y\max$, and a maximum angle difference between incident angles of the light beams upon the slit plane is $\theta\max$, Ff≠Fb holds and the following conditional formula is satisfied:

$$|(Fb/Ff)\times\delta X-(Ff/Fb)\times\delta M1|\leq\delta Y\max/\theta\max$$

In the above multi-beam scanning optical system, preferably, the allowable dot position shift amount of each scanning line is not larger than ½ of resolution in a sub-scan direction.

The above multi-beam scanning optical system preferably further comprises a compensating unit for shifting a focus position, in the main scan section, of each light beam introduced to the synchronous detection sensor in a direction of an optical axis of the synchronous detection optical unit relative to the slit.

The above multi-beam scanning optical system preferably includes a compensating unit for shifting a position of the slit or a unit including the slit in the direction of the optical axis of the synchronous detection optical unit.

In the above multi-beam scanning optical system, preferably, the synchronous detection lens unit is disposed in an optical path between the deflecting unit and the slit, and includes a compensating unit for shifting at least one lens of the synchronous detection lens unit in the direction of the optical axis of the synchronous detection optical unit.

In the above multi-beam scanning optical system, preferably, the synchronous detection lens unit comprises a single lens and is formed integrally with a part of optical elements constituting the entrance optical unit.

According to another aspect of the present invention, there is provided a multi-beam scanning optical system comprising an entrance optical unit for introducing, to a deflecting unit, a plurality of light beams emitted from a light source unit having a plurality of light emitting portions arranged apart from each other at least in a main scan direction; a scanning optical unit for focusing the plurality of light beams deflected by the deflecting unit on a surface to be scanned; and a synchronous detection optical unit for converging, by a synchronous detection lens unit, parts of the plurality of light beams deflected by the deflecting unit on a plane of a slit, introducing the parts of the plurality of light beams to a synchronous detection sensor, and controlling timing of scan start positions on the surface to be scanned with respect to the plurality of light beams by using signals from the synchronous detection sensor, wherein the multi-beam scanning optical system further comprises a compensating unit for compensating a dot position shift of each scanning line on the surface to be scanned, the dot position shift being caused by the fact that, assuming that a focal distance of the scanning optical unit is Ff, a focal distance of the synchronous detection lens unit is Fb, a focus position shift amount of each light beam introduced to the synchronous detection sensor in a main scan section is $\delta M1$ looking from the slit, and a focus position shift amount of each image height is $\delta X$ looking from the surface to be scanned, Ff≠Fb holds and $|(Fb/Ff)\times\delta X-(Ff/Fb)\times\delta M1|$ has a certain value.

In the above multi-beam scanning optical system, preferably, a dot position shift amount of each scanning line on the surface to be scanned is not larger than ½ of resolution in a sub-scan direction.

The above multi-beam scanning optical system preferably further comprises a compensating unit for shifting a focus position, in the main scan section, of each light beam introduced to the synchronous detection sensor in a direction of an optical axis of the synchronous detection optical unit relative to the slit.

The above multi-beam scanning optical system preferably includes a compensating unit for shifting a position of the slit or a unit including the slit in the direction of the optical axis of the synchronous detection optical unit.

In the above multi-beam scanning optical system, preferably, the synchronous detection lens unit is disposed in an optical path between the deflecting unit and the slit, and includes a compensating unit for shifting at least one lens of the synchronous detection lens unit in the direction of the optical axis of the synchronous detection optical unit.

In the above multi-beam scanning optical system, preferably, the plurality of light emitting portions are arranged apart from each other in the sub-scan direction.

In the above multi-beam scanning optical system, preferably, the slit or a unit including the slit is inclined in the sub-scan direction depending on the dot position shift amount of each scanning line on the surface to be scanned.

The above multi-beam scanning optical system preferably further comprises an angle adjusting unit rotating the slit or a unit including the slit about the optical axis of the synchronous detection optical unit depending on the dot position shift amount of each scanning line on the surface to be scanned.

According to still another aspect of the present invention, there is provided a multi-beam scanning optical system comprising an entrance optical unit for introducing, to a deflecting unit, a plurality of light beams emitted from a light source unit having a plurality of light emitting portions arranged apart from each other at least in a main scan direction; a scanning optical unit for focusing the plurality of light beams deflected by the deflecting unit on a surface to be scanned; and a synchronous detection optical unit for introducing, by a synchronous detection lens unit, parts of the plurality of light beams deflected by the deflecting unit to a synchronous detection sensor and controlling timing of scan start positions on the surface to be scanned with respect to the plurality of light beams by using signals from the synchronous detection sensor, wherein, assuming that a focal distance of the scanning optical unit is Ff, a focal distance of the synchronous detection lens unit is Fb, a focus position shift amount of each light beam introduced to the synchronous detection sensor in a main scan section is δM2 looking from a light receiving surface of the synchronous detection sensor, a focus position shift amount of each image height is δX looking from the surface to be scanned, an allowable dot position shift amount of each scanning line is δYmax, and a maximum angle difference between incident angles of the light beams upon the light receiving surface of the synchronous detection sensor is θmax, Ff≠Fb holds and the following conditional formula is satisfied:

$$|(Fb/Ff) \times \delta X - (Ff/Fb) \times \delta M2| \leq \delta Y max/\theta max$$

In the above multi-beam scanning optical system, preferably, the allowable dot position shift amount of each scanning line is not larger than ½ of resolution in a subscan direction.

The above multi-beam scanning optical system preferably further comprises a compensating unit for shifting a focus position, in the main scan section, of each light beam introduced to the synchronous detection sensor in a direction of an optical axis of the synchronous detection optical unit relative to the light receiving surface of the synchronous detection sensor.

In the above multi-beam scanning optical system, preferably, the multi-beam scanning optical system includes a compensating unit for shifting a position of the synchronous detection sensor or a unit including the synchronous detection sensor in the direction of the optical axis of the synchronous detection optical unit.

In the above multi-beam scanning optical system, preferably, the synchronous detection lens unit is disposed in an optical path between the deflecting unit and the synchronous detection sensor, and includes a compensating unit for shifting at least one lens of the synchronous detection lens unit in the direction of the optical axis of the synchronous detection optical unit.

In the above multi-beam scanning optical system, preferably, the synchronous detection lens unit comprises a single lens and is formed integrally with a part of optical elements constituting the entrance optical unit.

According to still another aspect of the present invention, there is provided a multi-beam scanning optical system comprising an entrance optical unit for introducing, to a deflecting unit, a plurality of light beams emitted from a light source unit having a plurality of light emitting portions arranged apart from each other at least in a main scan direction; a scanning optical unit for focusing the plurality of light beams deflected by the deflecting unit on a surface to be scanned; and a synchronous detection optical unit for introducing, by a synchronous detection lens unit, parts of the plurality of light beams deflected by the deflecting unit to a synchronous detection sensor and controlling timing of scan start positions on the surface to be scanned with respect to the plurality of light beams by using signals from the synchronous detection sensor, wherein the multi-beam scanning optical system further comprises a compensating unit for compensating a dot position shift of each scanning line on the surface to be scanned, the dot position shift being caused by the fact that, assuming that a focal distance of the scanning optical unit is Ff, a focal distance of the synchronous detection lens unit is Fb, a focus position shift amount of each light beam introduced to the synchronous detection sensor in a main scan section is δM2 looking from a light receiving surface of the synchronous detection sensor, and a focus position shift amount of each image height is δX looking from the surface to be scanned, Ff≠Fb holds and $|(Fb/Ff) \times \delta X - (Ff/Fb) \times \delta M2|$ has a certain value.

In the above multi-beam scanning optical system, preferably, a dot position shift amount of each scanning line on the surface to be scanned is not larger than ½ of resolution in a sub-scan direction.

In the above multi-beam scanning optical system, preferably, the plurality of light emitting portions are arranged apart from each other in the sub-scan direction.

The above multi-beam scanning optical system, preferably further comprises a compensating unit for shifting a focus position, in the main scan section, of each light beam introduced to the synchronous detection sensor in a direction of an optical axis of the synchronous detection optical unit relative to the light receiving surface of the synchronous detection sensor.

In the above multi-beam scanning optical system, preferably, the multi-beam scanning optical system includes a compensating unit for shifting a position of the synchronous detection sensor or a unit including the synchronous detection sensor in the direction of the optical axis of the synchronous detection optical unit.

In the above multi-beam scanning optical system, preferably, the synchronous detection lens unit is disposed in an optical path between the deflecting unit and the synchronous detection sensor, and includes a compensating unit for shifting at least one lens of the synchronous detection lens unit in the direction of the optical axis of the synchronous detection optical unit.

According to still another aspect of the present invention, there is provided a multi-beam scanning optical system comprising an entrance optical unit for introducing, to a deflecting unit, a plurality of light beams emitted from a light source unit having a plurality of light emitting portions arranged apart from each other at least in a main scan direction; a scanning optical unit for focusing the plurality of light beams deflected by the deflecting unit on a surface to be scanned; and a synchronous detection optical unit for converging, by a synchronous detection lens unit, parts of the plurality of light beams deflected by the deflecting unit on a plane of a slit, introducing the parts of the plurality of light beams to a synchronous detection sensor, and controlling timing of scan start positions on the surface to be scanned with respect to the plurality of light beams by using signals from the synchronous detection sensor, wherein an amount of dot position shift of each scanning line on the surface to be scanned is not larger than ½ of resolution in a sub-scan direction, the dot position shift being caused by the fact that, assuming that a focal distance of the scanning optical unit is Ff, a focal distance of the synchronous detection lens unit is Fb, a focus position shift amount of each light beam introduced to the synchronous detection sensor in a main scan section is δM1 looking from the slit, and a focus position shift amount of each image height is δX looking from the surface to be scanned, Ff≠Fb holds and |(Fb/Ff)×δX−(Ff/Fb)×δM1| has a certain value.

According to still another aspect of the present invention, there is provided a multi-beam scanning optical system comprising an entrance optical unit for introducing, to a deflecting unit, a plurality of light beams emitted from light source unit having a plurality of light emitting portions arranged apart from each other at least in a main scan direction; a scanning optical unit for focusing the plurality of light beams deflected by the deflecting unit on a surface to be scanned; and a synchronous detection optical unit for introducing, by a synchronous detection lens unit, parts of the plurality of light beams deflected by the deflecting unit to a synchronous detection sensor and controlling timing of scan start positions on the surface to be scanned with respect to the plurality of light beams by using signals from the synchronous detection sensor, wherein an amount of dot position shift of each scanning line on the surface to be scanned is not larger than ½ of resolution in a sub-scan direction, the dot position shift being caused by the fact that, assuming that a focal distance of the scanning optical unit is Ff, a focal distance of the synchronous detection lens unit is Fb, a focus position shift amount of each light beam introduced to the synchronous detection sensor in a main scan section is δM2 looking from a light receiving surface of the synchronous detection sensor, and a focus position shift amount of each image height is δX looking from the surface to be scanned, Ff≠Fb holds and |(Fb/Ff)×δX−(Ff/Fb)×δM2| has a certain value.

According to still another aspect of the present invention, there is provided an image forming apparatus comprising one of the multi-beam scanning optical systems set forth above; a photoconductor arranged on a surface to be scanned; a developing unit for developing, into a toner image, an electrostatic latent image formed on the photoconductor by light beams scanned by the multi-beam scanning optical system; a transfer unit for transferring the developed toner image onto a material to which the toner image is to be transferred; and a fusing unit for fusing the transferred toner image onto the material to which the toner image is to be transferred.

According to still another aspect of the present invention, there is provided an image forming apparatus comprising one of the multi-beam scanning optical systems set forth above; and a printer controller for converting code data inputted from an external device into an image signal and applying the image signal to the beam scanning optical system.

Further objects, features and advantages of the present invention will become apparent from the following description of the preferred embodiments with reference to the attached drawings.

BRIEF DESCRIPTION OF THE DRAWINGS

FIGS. 9A and 9B are explanatory views showing an inclination of a slit and printing positions (before adjustment) of light beams in the fifth embodiment of the present invention.

FIGS. 10A and 10B are explanatory views showing an inclination of the slit and printing positions (after adjustment) of the light beams in the fifth embodiment of the present invention.

FIG. 11 is a sectional view of a sixth embodiment of the present invention in the main scan direction.

FIGS. 19A and 19B are explanatory views showing the positional relationship between two light beams when the focus position is not shifted.

FIGS. 20A and 20B are explanatory views showing the positional relationship between two light beams when the focus position is shifted to the upstream side (the side nearer to a deflecting unit) with respect to a BD slit.

FIGS. 23A and 23B are explanatory views showing the positional relationship between two light beams when the focus position is shifted to the downstream side (the side away from the deflecting unit) with respect to the BD slit.

FIGS. 24A and 24B are explanatory views showing the positional relationship between two light beams when the focus position is shifted to the downstream side (the side away from the deflecting unit) with respect to the surface to be scanned.

FIGS. 25A and 25B are explanatory views showing the positional relationship between two light beams when the focus position is shifted to the upstream side (the side nearer to the deflecting unit) with respect to the BD slit and the surface to be scanned.

FIGS. 26A and 26B are explanatory views showing the positional relationship between two light beams when the focus position is shifted to the downstream side (the side away from the deflecting unit) with respect to the BD slit and the surface to be scanned.

DESCRIPTION OF THE PREFERRED EMBODIMENTS

[First Embodiment]

Figure 1:
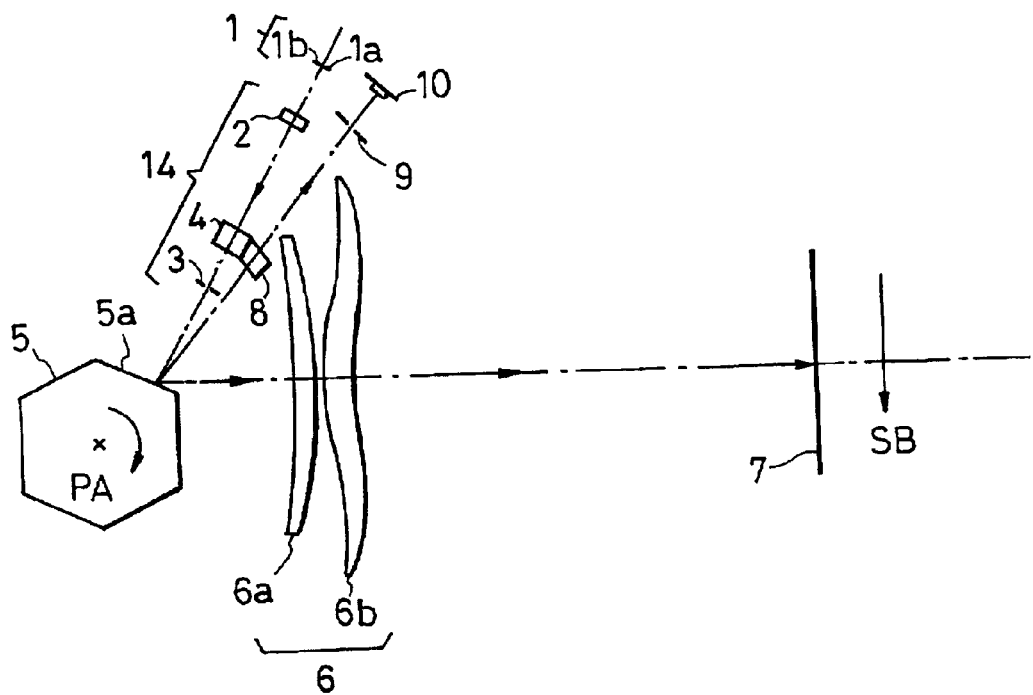
FIG. 1 is a sectional view of a first embodiment of the present invention in the main scan direction.

FIG. 1 is a sectional view (main scan section view) of principal part of a multi-beam scanning optical system according to a first embodiment of the present invention in the main scan direction.

Note that, in this specification, a plane formed by an optical axis of a scanning optical system and a light beam deflected by an optical deflector is defined as a main scan section, and a plane including the optical axis of the scanning optical system and being perpendicular to the main scan section is defined as a sub-scan section.

Figure 2:
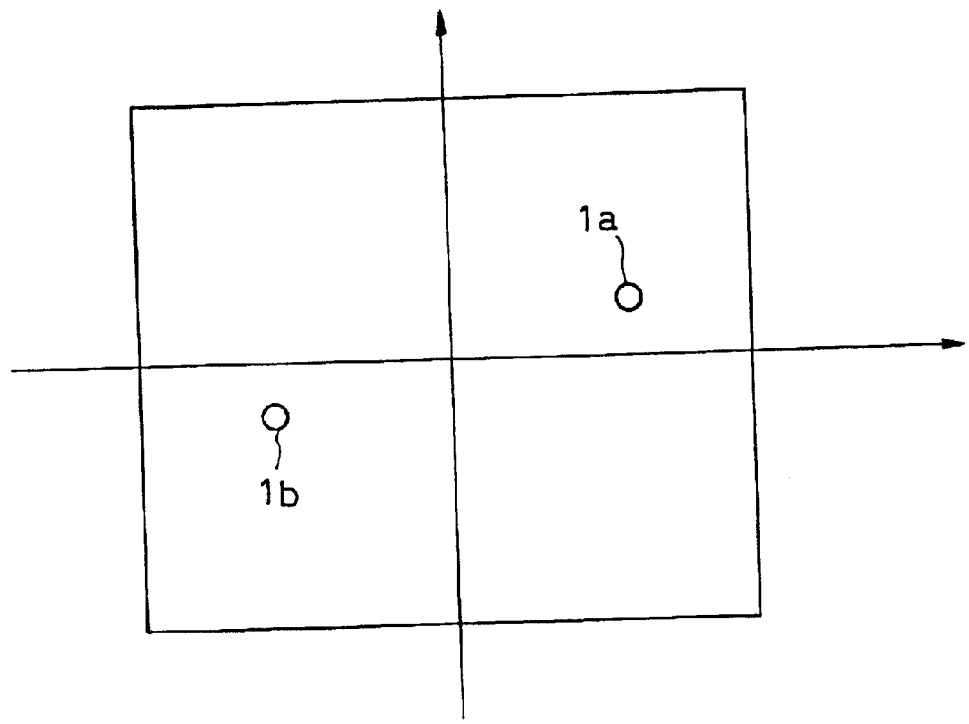
FIG. 2 is an explanatory view showing an arrangement of light emitting portions.

Referring to FIG. 1, numeral 1 denotes a light source unit (light source means) comprising two light emitting portions (light sources) 1a, 1b constituted by, e.g., semiconductor lasers. The number of light emitting portions may be three or more. As shown in FIG. 2, the two light emitting portions 1a, 1b are separately arranged from each other in both the main scan direction and the sub-scan direction. The distance between the light emitting portions is longer in the main scan direction than in the sub-scan direction. The reason is that the actual distance between the light emitting portions in the sub-scan direction is longer than the actually required distance between the light emitting portions, and a desired value of the distance between the light emitting portions in the sub-scan direction is obtained by rotating the light source unit 1 comprising the two light emitting portions 1a, 1b.

Numeral 2 denotes a collimator lens for converting divergent light beams emitted from the light emitting portions 1a, 1b into substantially parallel light beams.

Numeral 4 denotes a cylindrical lens that has predetermined refracting power only in the sub-scan direction. The cylindrical lens 4 is formed integrally with a BD lens unit 8 (described later).

Numeral 3 denotes an aperture diaphragm for shaping each of light beams emitted from the light emitting portions 1a, 1b and having passed the collimator lens 2 and the cylindrical lens 3 into an optimum beam shape. In this embodiment, the aperture diaphragm 3 is positioned nearer to a deflecting surface 5a of a deflecting unit 5 (described later) so that deflecting points of the light beams illuminated from the light emitting portions 1a, 1b are closer to each other and a dot position shift is reduced. In other words, by reducing a value of d in the above-mentioned formulae (7a) and (7b), an angle difference between the incident angles of the light beams upon the deflecting surface is reduced and a dot position shift δY is eventually lessened.

The above-mentioned elements, such as the collimator lens 2, the cylindrical lens 4 and the aperture diaphragm 3, constitute respective components of an entrance optical system 14.

Numeral 5 denotes an optical deflector (deflecting means) that is constituted by a rotating polygon mirror, for example, and is rotated at a constant speed in a direction of arrow PA, shown in FIG. 1, by a driving unit (not shown) such as a motor.

Numeral 6 denotes a scanning optical system 56 that has the fθ characteristic and comprises two first and second optical elements (fθ lenses) 6a, 6b. The scanning optical system 6 focuses the two light beams deflected by the optical deflector 5 into the form of spots on a surface 7 to be scanned, thereby forming two scanning lines. The scanning optical system 6 has the function of compensating a field tilt by holding a conjugate relationship between the deflecting surface 5a of the optical deflector 5 or the vicinity thereof and a photoconductor drum surface 7 or the vicinity thereof in a sub-scan section.

Numeral 8 denotes a lens unit for beam synchronous detection (referred to as a "BD lens unit" hereinafter). The BD lens unit 8 is constituted by a single anamorphic lens formed integrally with the cylindrical lens 4, and is disposed in an optical path between the optical deflector 5 and a BD slit 9 (described later). The BD lens unit 8 focuses two light beams for sync signal detection (referred to as "BD light beams" hereinafter) on the plane of a slit 9 provided in the vicinity of a synchronous detection sensor 10 (described later).

Numeral 9 denotes a slit for beam synchronous detection (referred to as a "BD slit" hereinafter) that is disposed at or near focused points of the BD light beams focused by the BD lens unit 8, and decides write start positions of images.

Numeral 10 denotes a photosensor (referred to as a "BD sensor" hereinafter) serving as a synchronous detection sensor. In this embodiment, the timing of a scan start position for image recording on the photoconductor drum surface 7 is adjusted for each of the light beams emitted from the light emitting portions by using a sync signal (BD signal) that is obtained by sensing an output signal from the BD sensor 10.

From the viewpoint of space effectiveness, the BD lens unit 8 in this embodiment is set such that a focal distance Fb of the BD lens unit 8 is shorter than a focal distance Ff of the scanning optical system 6. Also, in this embodiment, the cylindrical lens 4 and the BD lens unit 8 are formed integrally with each other, as described above, for a simpler construction. Further, each of the light beams entering the BD lens unit 8 is in the form of a substantially parallel light beam in the main scan section and a divergent light beam in the sub-scan section. To converge the light beam having such a property at the BD slit, the BD lens unit 8 is constituted as an anamorphic lens. The above-mentioned elements, such as the BD lens unit 8, the BD slit 9 and the BD sensor 10, constitute respective components of an optical means for beam synchronous detection (BD optical system).

In this embodiment, two light beams emitted from the light source unit 1 while being optically modulated depending on image information are each converted into a substantially parallel light beam by the collimator lens 2 and then enters the cylindrical lens 4. The cylindrical lens 4 allows the light beam incident upon the same to exit, as it is, in the main scan section, but focuses the light beam in the sub-scan direction. Therefore, the cylindrical lens 4 forms a substantially linear image (linear image extending in the main scan direction) on the deflecting surface 5a of the optical deflector 5 through the aperture diaphragm 3. On that occasion, the size of section of each light beam is restricted by the aperture diaphragm 3. The two light beams reflected and deflected by the deflecting surface 5a of the optical deflector 5 are then focused by the scanning optical system 6 into the form of spots on the photoconductor drum surface 7. By rotating the optical deflector 5 in the direction of arrow PA, the photoconductor drum surface 7 is optically scanned with the light beams at a constant speed in the direction of arrow SB (i.e., in the main scan direction). As a result, images are recorded on the photoconductor drum surface 7 as a recording medium.

For the purpose of adjusting the timing of the scan start position on the photoconductor drum surface 7 before the photoconductor drum surface 7 is optically scanned, respective parts of the two light beams reflected and deflected by the optical deflector 5, i.e., the light beams for sync signal detection (BD light beams), are converted in the main scan section by the BD lens unit 8 onto the plane of the BD slit 9, and are introduced to the BD sensor 10. Then, by using the sync signal (BD signal) that is obtained by sensing an output signal from the BD sensor 10, the timing of the scan start position for image recording on the photoconductor drum surface 7 is adjusted for each of the light beams emitted from the light emitting portions.

In the above arrangement, if the focus positions of the BD light beams and/or the scanning light beams are shifted looking from the plane of the BD slit 9 and the surface 7 to be scanned, respectively, problems occurs, as described above with reference to FIGS. 19 to 26, in that the write start positions of the light beams A, B are shifted from each other and the relative positional relationship between the light beams A and B in the main scan direction is changed during scan, thus resulting in degradation of a printed image.

In this embodiment, the above-mentioned problems are overcome by setting various factors so as to satisfy the following conditional formula (A). Specifically, assuming that the focal distance of the scanning optical system is Ff, the focal distance of the synchronous detection optical system is Fb, the focus position shift amount of each light beam introduced to the BD sensor 10 in the main scan section is $\delta M1$ looking from the BD slit 9, the focus position shift amount of each image height is $\delta X$ looking from the surface to be scanned, the allowable dot position shift amount of each scanning line is $\delta Ymax$, and the maximum angle difference between the incident angles of the light beams upon the BD slit 9 is $\theta max$, $Ff \neq Fb$ holds and the following conditional formula (A) is satisfied:

$$|(Fb/Ff) \times \delta X - (Ff/Fb) \times \delta M1| \leq \delta Ymax/\theta max \quad (A)$$

As one practical example of numerical values, given the resolution in the sub-scan direction being 1200 dpi, $\delta Ymax = 10.5 \mu m$, $\theta max = 0.3$ [deg], the focal distance Ff of the scanning optical system=140 mm, and the focal distance Fb of the synchronous detection lens unit=70 mm, $\delta X$ and $\delta Yb$ are set so that a value of the left side ($|(Fb/Ff) \times \delta X - (Ff/Fb) \times \delta M1|$) of the above conditional formula (A) is kept not larger than 2 mm. For example, $\delta X$ is given by;

$\delta X \leq 4.0$ mm in the case of $\delta M1 = 0$, and $\delta M1$ is given by;

$\delta M1 \leq 1.0$ mm in the case of $\delta X = 0$. As a result, high-quality printing at high speed is realized in this embodiment.

Additionally, in this embodiment, the allowable dot position shift amount $\delta Ymax$ of each scanning line is set to be not larger than ½ of the resolution in the sub-scan direction.

The reason why the allowable dot position shift amount of each scanning line is preferably not larger than ½ of the resolution in the sub-scan direction is as follows. Assuming that the number of light sources is two and each scanning line produces a dot shift amount of 1 dot, an image preceding or succeeding one dot is printed at a position at which a proper image should be printed, whereby an image is printed at a position at which it should not be printed, or conversely an image is not printed at a position at which it should be printed. Hence, a resulting printed image is very unsightly. To avoid such a phenomenon, it is desired that the dot shift amount be zero (0). In practice, however, there is a difficulty in setting the dot shift amount to be zero. If the dot shift amount is held as small as not larger than a ½ dot (about 10 $\mu m$ at 1200 dpi), users hardly feel unsightly when looking at an actually printed image. On the contrary, if the dot shift in excess of a ½ dot occurs, such a shift becomes discernable in most cases, although depending on the type of an actually printed image, and a printed condition cannot be said as being satisfactory.

For the sake of brevity, the number of light source is limited to two in the above description, but such a phenomenon occurs regardless of the number of light sources. Therefore, the maximum value of the dot shift mount requires to be not larger than a ½ dot.

Also, in this embodiment, it is assumed that the time interval from the time at which the light beam A enters the BD sensor 10 and the BD sensor 10 generates an output signal to the time at which printing on the photoconductor drum surface 7 is started, is equal to the time interval from the time at which the light beam B enters the BD sensor 10 and the BD sensor 10 generates an output signal to the time at which printing on the photoconductor drum surface 7 is started.

While in this embodiment each of the light beams emitted from the light source unit 1 is converted by the collimator lens 2 into a substantially parallel light beam, the present invention is not limited to such an arrangement. Each light beam may be converted into, e.g., a convergent or divergent light beam, and these modifications can also provide similar advantages to those in the above-mentioned first embodiment.

Further, while this embodiment has been described in connection with the case of using two light beams (laser beams), the present invention is not limited to such an arrangement, but may use three or more light beams. While the scanning optical system in this embodiment comprises two lenses, the present invention is not limited to such an arrangement, and the scanning optical system may comprise one lens or three or more lenses.

In the first embodiment, two light beams emitted from the two light emitting portions 1a, 1b are detected by the BD sensor 10. Thus, beam synchronous detection is performed for each of a plurality of light beams.

The present invention is particularly effective when applied to a system in which the beam synchronous detection is performed for each of a plurality of light beams as with the first embodiment. However, the present invention is also applicable to a system in which three or more light emitting portions are provided and at least two of light beams emitted from the three or more light emitting portions are detected by the BD sensor 10.

For example, the present invention can be applied to the following case. A monolithic 2-beam light source A and a monolithic 2-beam light source B are provided to emit four beams of (2×2). Two light beams A1, A2 emitted from the monolithic 2-beam light source A and two light beams B1, B2 emitted from the monolithic 2-beam light source B are combined with each other by a beam combining system comprising a prism, a polarized beam splitter, etc. Of those four light beams, two ones, i.e., the light beam A1 emitted from the monolithic 2-beam light source A and the light beam B1 emitted from the monolithic 2-beam light source B, are detected by the BD sensor 10. In other words, the present invention is applicable to the system in which the beam synchronous detection is performed on the two light beams A1, B1, but not on the two light beams A2, B2.

[Second Embodiment]

Figure 3:
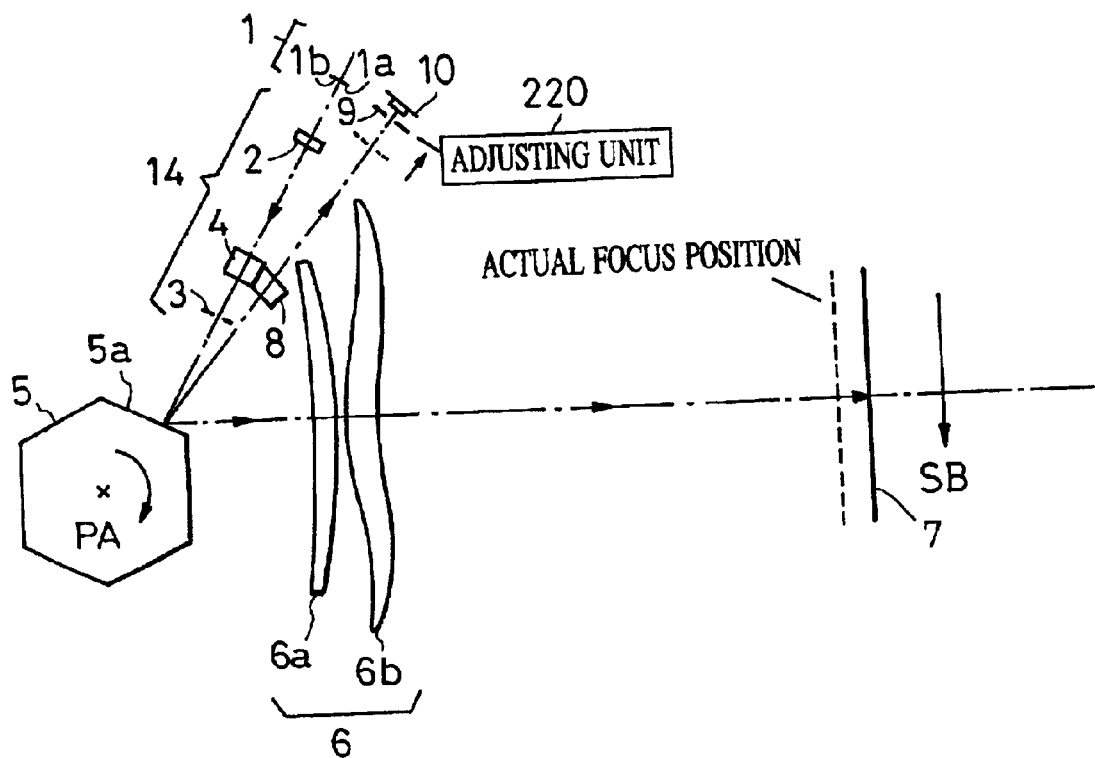
FIG. 3 is a sectional view of a second embodiment of the present invention in the main scan direction.
Figure 4:
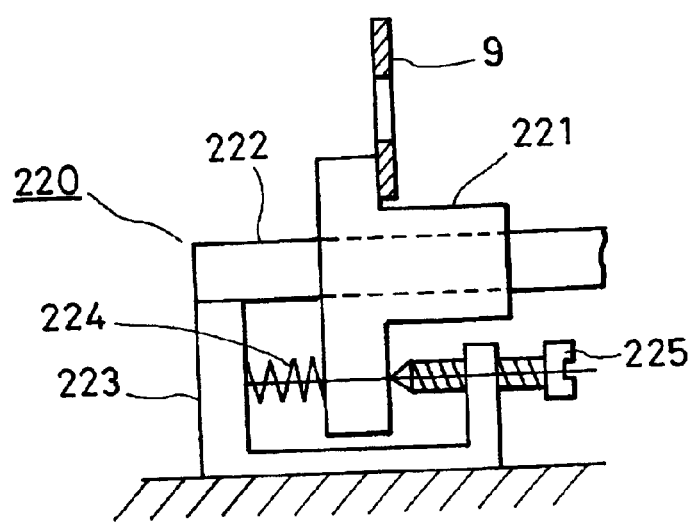
FIG. 4 is an explanatory view showing an adjusting unit used in the second embodiment of the present invention.

FIG. 3 is a sectional view (main scan section view) of principal part of a multi-beam scanning optical system according to a second embodiment of the present invention in the main scan direction, and FIG. 4 is a schematic explanatory view showing principal part of an adjusting unit applied to the second embodiment of the present invention shown in FIG. 3. Note that, in FIGS. 3 and 4, the same components as those shown in FIG. 1 are denoted by the same reference numerals.

This second embodiment differs from the first embodiment in that the above conditional formula (A) is satisfied by shifting the focus position, in the main scan section, of the BD light beam introduced to the BD sensor 10 in the direction of the optical axis of the BD optical system relative to the BD slit 9 by using an adjusting unit as one element of compensating means. The other arrangement and optical action are the same as those in the first embodiment, whereby similar advantages are also obtained.

Stated otherwise, in the case in which an image plane curvature condition of the scanning optical system 6 is nearly flat and the left side ($|(Fb/Ff) \times \delta X - (Ff/Fb) \times \delta M1|$) of the above conditional formula (A) has a non-negligible value when the BD slit 9 is arranged in the focus position, the above conditional formula (A) is satisfied by displacing the BD slit 9 from the focus position in the direction of the optical axis of the BD optical system with an adjusting unit 220 (FIG. 4), as shown in FIG. 3. With such an adjustment, high-quality printing at high speed is realized.

A description is now made of the adjusting unit 220 for adjusting the dot position shift with reference to FIG. 4.

The BD slit 9 shown in FIG. 4 is movable for adjustment in the direction of the optical axis of the BD optical system with the adjusting unit 220. More specifically, as shown in FIG. 4, the BD slit 9 is fixed to a support 221 by, e.g., bonding. The support 221 is fitted over a guide 222 to be movable in the direction of the optical axis. A holder 223 is fixedly provided in an image forming apparatus. The guide 222 is fixed to the holder 223 that has a channel-like shape and is fixed to a stationary member of the image forming apparatus. A compressive spring 224 is interposed between the holder 223 and the support 221 and produces a resilient force acting on the support 221 to move it to the left in FIG. 4. An adjusting screw 225 is screwed over the holder 223 such that its fore end abuts against the support 221 from the right side to stop movement of the support 221 urged by the resilient force of the spring 224. Accordingly, the support 221 can be displaced to the right side in FIG. 4 by fastening the adjusting screw 225, and to the left side by loosening the adjusting screw 225. Thus, the position of the BD slit 9 is adjustably moved in the direction of the optical axis so as to satisfy the above conditional formula (A) depending on the measured dot position shift amount δY between the light beams A and B on the surface to be scanned.

[Third Embodiment]

Figure 5:
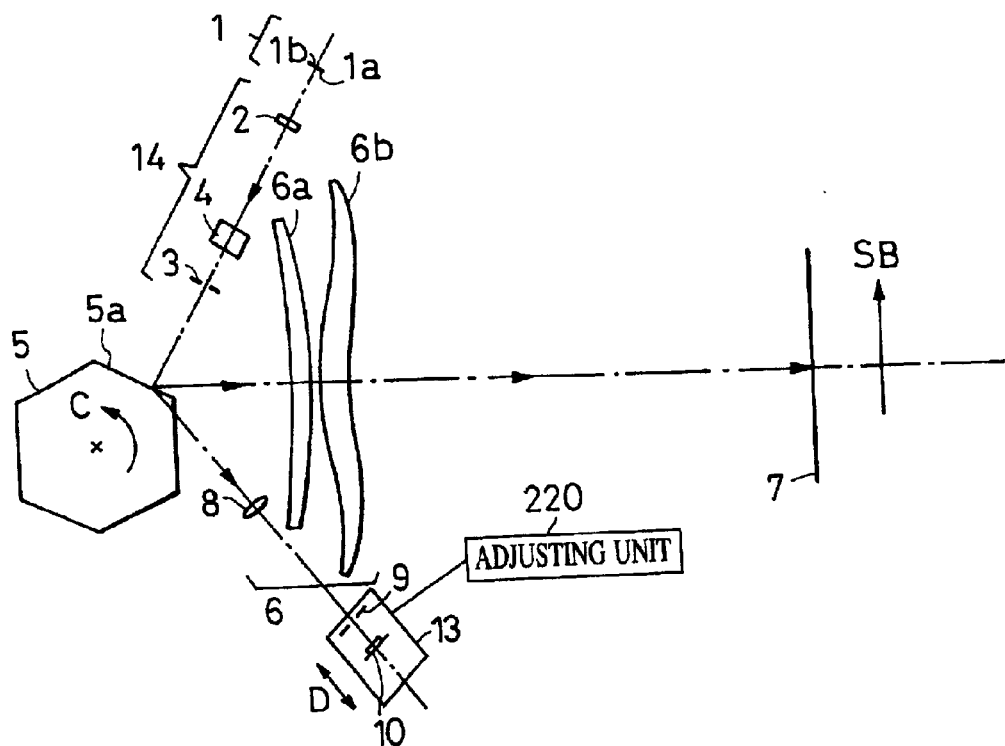
FIG. 5 is a sectional view of a third embodiment of the present invention in the main scan direction.

FIG. 5 is a sectional view (main scan section view) of principal part of a multi-beam scanning optical system according to a third embodiment of the present invention in the main scan direction. Note that, in FIG. 5, the same components as those shown in FIG. 1 are denoted by the same reference numerals.

This third embodiment differs from the first embodiment in that the above conditional formula (A) is satisfied by shifting a unit 13 including the BD slit 9 in the direction of the optical axis of the BD optical system by using an adjusting unit 220 as one element of compensating means, that the optical deflector is rotated in a reversed direction (direction of arrow C in FIG. 5), and that the cylindrical lens 4 and the BD lens unit 8 are constituted as separate members from each other. The other arrangement and optical action are substantially the same as those in the first embodiment, whereby similar advantages are also obtained.

More specifically, in this embodiment, the optical deflector 5 is rotated by a driving unit (not shown), such as a motor, at a constant speed in the direction of arrow C in FIG. 5 opposed to the rotating direction of the optical deflector 5 in the first embodiment. That arrangement intends to be adapted for the case in which the synchronous detection optical means (BD optical system) cannot be disposed between the scanning optical system 6 and the entrance optical system 14 because of a limitation on an available space.

In the arrangement of this third embodiment, as with the first embodiment, if the focus positions of the BD light beams and/or the scanning light beams are shifted relative to the plane of the BD slit 9 and the surface 7 to be scanned, respectively, problems occurs, as described above, in that the write start positions of the light beams A, B are shifted from each other and the relative positional relationship between the light beams A and B in the main scan direction is changed during scan, thus resulting in degradation of a printed image.

Particularly, in this embodiment, since δYmax=6 μm and θmax=0.3 [deg] are set to achieve a higher level of image quality, the value of the left side ($|(Fb/Ff) \times \delta X - (Ff/Fb) \times \delta M1|$) of the above conditional formula (A) must be set to be not larger than 1.15 mm. It is very difficult to construct a multi-beam scanning optical system having such optical performance in a stable state without adjustment.

In this embodiment, therefore, the unit 13 including the BD slit 9 is moved in the direction of the optical axis of the BD optical system, as indicated by arrow D shown in FIG. 5, by using the adjusting unit 220 (see FIG. 4) so that a focused condition of the BD light beam on the plane of the BD slit 9 in the main scan section is adjusted and the dot position shift is improved. As a result, high-quality printing at high speed is realized while satisfying the above-described specifications, i.e., the conditional formula (A).

[Fourth Embodiment]

Figure 6:
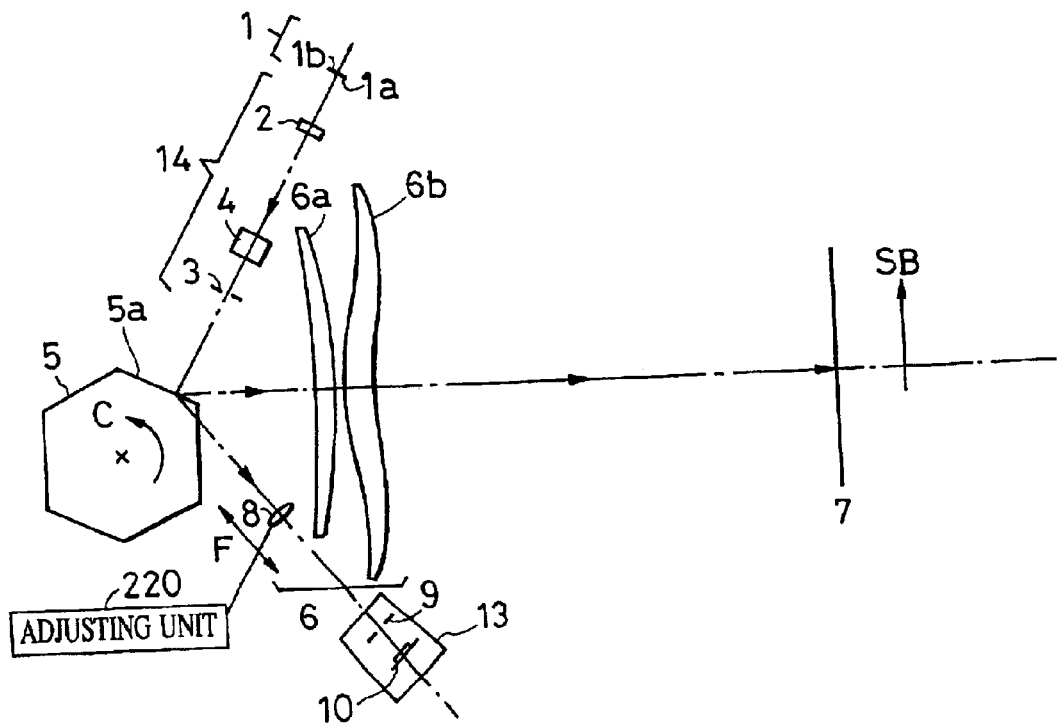
FIG. 6 is a sectional view of a fourth embodiment of the present invention in the main scan direction.

FIG. 6 is a sectional view (main scan section view) of principal part of a multi-beam scanning optical system according to a fourth embodiment of the present invention in the main scan direction. Note that, in FIG. 6, the same components as those shown in FIG. 5 are denoted by the same reference numerals.

This fourth embodiment differs from the third embodiment in that the above conditional formula (A) is satisfied by shifting the BD lens unit 8 in the direction of the optical axis of the BD optical system by using an adjusting unit as one element of compensating means while the BD slit 9 and the unit 13 including the BD slit 9 are both kept stationary. The other arrangement and optical action are substantially the same as those in the third embodiment, whereby similar advantages are also obtained.

More specifically, in this embodiment, the BD slit 9 and the unit 13 including the BD slit 9 are both kept stationary, and the BD lens unit 8 comprising a single lens is constructed not integrally with, but separately from the cylindrical lens 4 as with the third embodiment.

In the arrangement of this fourth embodiment, as with the first embodiment, if the focus positions of the BD light beams and/or the scanning light beams are shifted relative to the plane of the BD slit 9 and the surface 7 to be scanned, respectively, problems occurs, as described above, in that the write start positions of the light beams A, B are shifted from each other and the relative positional relationship between the light beams A and B in the main scan direction is changed during scan, thus resulting in degradation of a printed image.

In this embodiment, therefore, the BD lens unit 8 is moved in the direction of the optical axis of the BD optical system using the adjusting unit 220, as indicated by arrow F shown in FIG. 6, so that a focused condition of the BD light beam on the plane of the BD slit 9 in the main scan section is adjusted. As a result, high-quality printing at high speed is realized while satisfying the above conditional formula (A).

When this embodiment is applied to the case in which the degree of an image plane curvature due to the scanning optical system 6 is fairly stable for each product and the left side ($|(Fb/Ff) \times \delta X - (Ff/Fb) \times \delta M1|$) of the above conditional formula (A) has a non-negligible value when the BD slit 9 is arranged in the focus position, the above conditional formula (A) may be satisfied by displacing the BD lens unit 8 in the direction of the optical axis of the BD optical system beforehand so that the focus position is changed in the main scan section.

[Fifth Embodiment]

Figure 7:
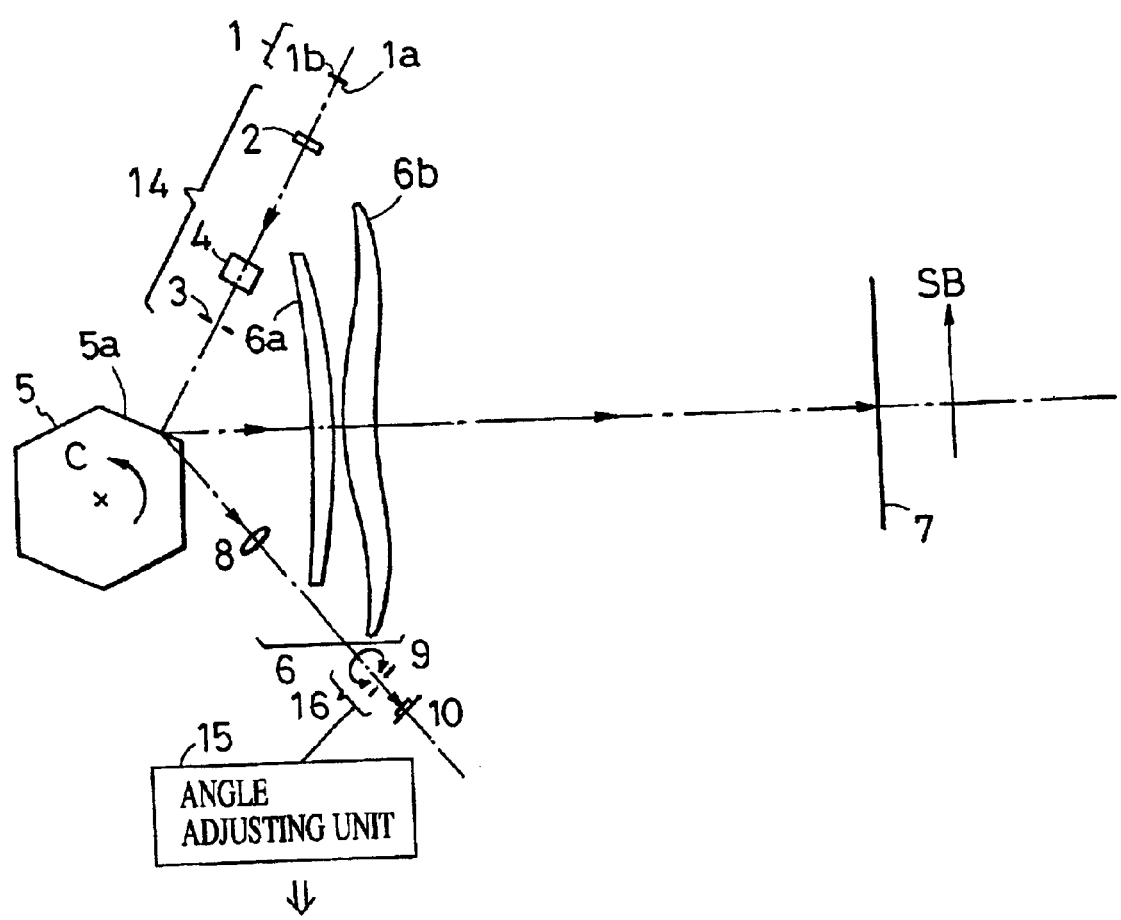
FIG. 7 is a sectional view of a fifth embodiment of the present invention in the main scan direction.
Figure 8:
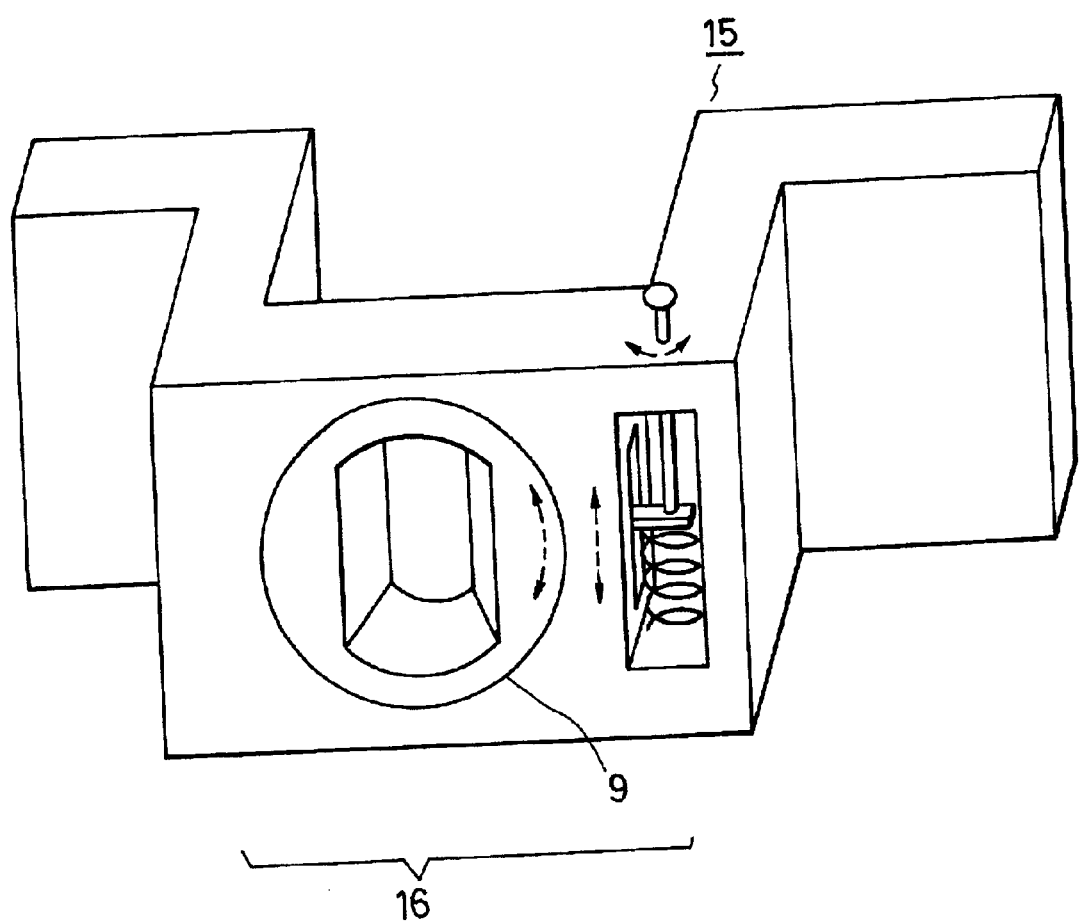
FIG. 8 is a perspective view of an angle adjusting unit according to the fifth embodiment of the present invention.

FIG. 7 is a sectional view (main scan section view) of principal part of a multi-beam scanning optical system according to a fifth embodiment of the present invention in the main scan direction, and FIG. 8 is a perspective view showing principal part of an angle adjusting unit shown in FIG. 7. Note that, in FIG. 7, the same components as those shown in FIG. 1 are denoted by the same reference numerals.

As described above, assuming that the focal distance of the scanning optical system 6 is Ff, the focal distance of the synchronous detection lens unit 8 is Fb, the focus position shift amount of each BD light beam introduced to the BD sensor 10 in the main scan section is $\delta M1$ looking from the BD slit 9, the focus position shift amount of each image height is $\delta X$ looking from the surface 7 to be scanned, each scanning line causes a dot position shift on the surface to be scanned if Ff≠Fb holds and the left side ($|(Fb/Ff) \times \delta X - (Ff/Fb) \times \delta M1|$) of the above conditional formula (A) has a certain value. In this embodiment, such a dot position shift is compensated by rotating the BD slit 9 or a unit 16 including the BD slit 9 about the optical axis of the BD optical system by using an angle adjusting unit 15 as one element of compensating means, shown in FIG. 8, depending on the dot position shift amount of each scanning line on the surface to be scanned.

Additionally, in this embodiment, the allowable dot position shift amount of each scanning line on the surface to be scanned is set to be not larger than ½ of the resolution in the sub-scan direction.

In the light source unit 1 in this embodiment, as shown in FIG. 2, the two light emitting portions 1a, 1b are separately arranged from each other in the sub-scan direction as well, and the light beams A, B emitted from the light emitting portions 1a, 1b pass different points in the sub-scan direction.

In this embodiment, therefore, the timing at which the light beam B starts entering the BD sensor 10 relative to the light beam A is changed by rotating the BD slit 9 in a predetermined direction with the angle adjusting unit 15, as shown in FIGS. 9A, 9B, 10A and 10B.

FIGS. 9A and 9B are explanatory views showing an inclination of the BD slit 9 and printing positions (before adjustment) of the light beams A, B, respectively. FIGS. 10A and 10B are explanatory views showing an inclination of the BD slit 9 and printing positions (after adjustment) of the light beams A, B, respectively.

Thus, in this embodiment, the dot position shift that is otherwise caused due to both the focus position shift amount $\delta M1$ of each BD light beam introduced to the BD sensor 10 in the main scan section and the focus position shift amount $\delta X$ of each image height relative to the surface 7 to be scanned, as described above, is compensated (canceled) by rotating the BD slit 9 with the angle adjusting unit 15. As a result, high-quality printing at high speed is realized.

Note that the optical action for forming an image by the use of the multi-beam scanning optical system in this embodiment is essentially the same as that in the first embodiment.

[Sixth Embodiment]

Figure 12A:
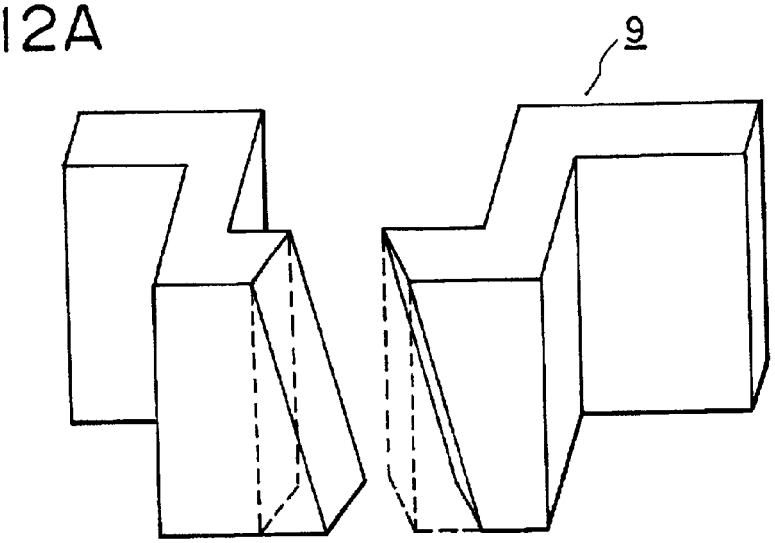
FIGS. 12A to 12C are each a perspective view of principal part of a slit in the sixth embodiment of the present invention.
Figure 12B:
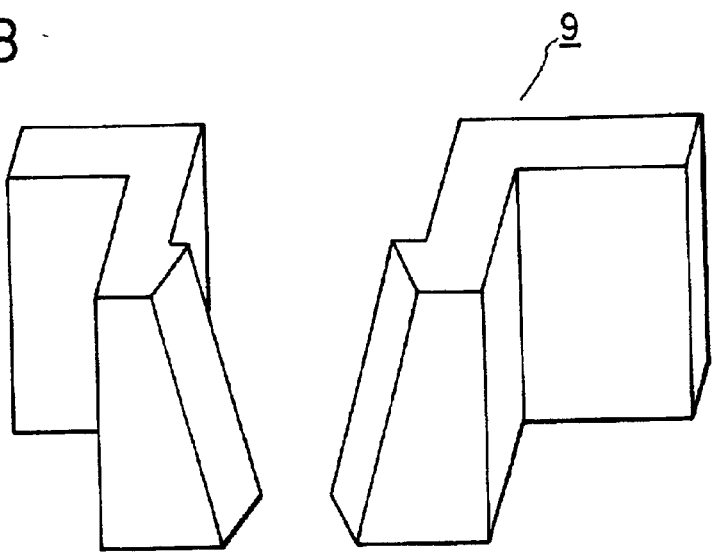
Figure 12C:
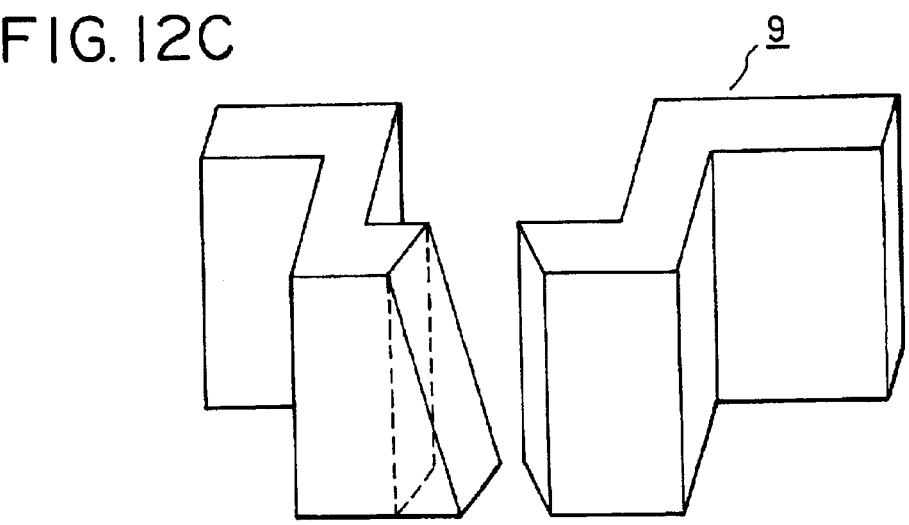
Figure 13:
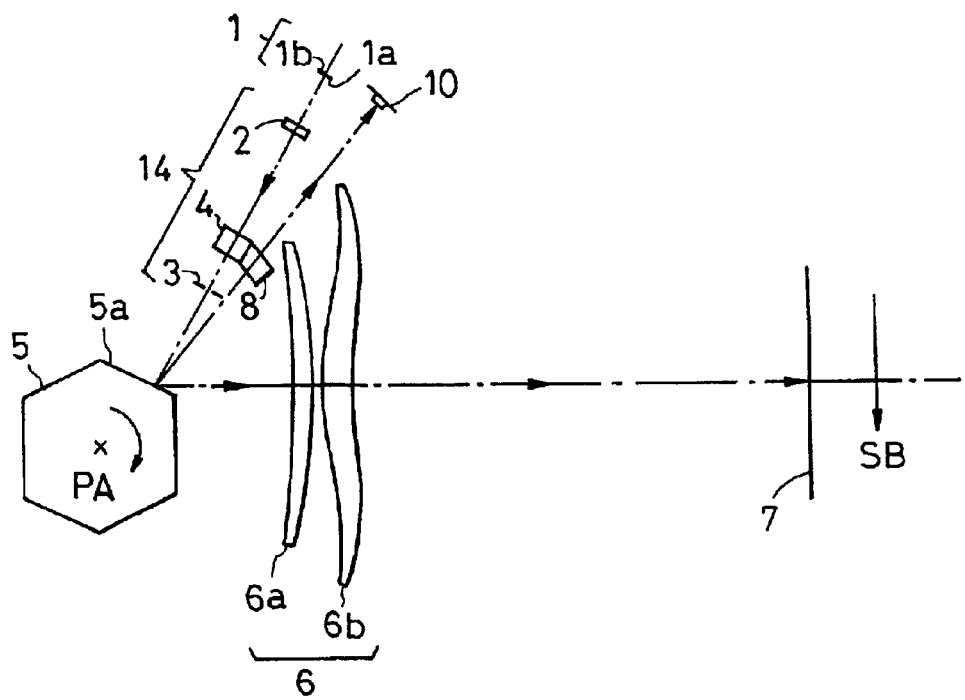
FIG. 13 is a sectional view of a seventh embodiment of the present invention in the main scan direction.
Figure 14:
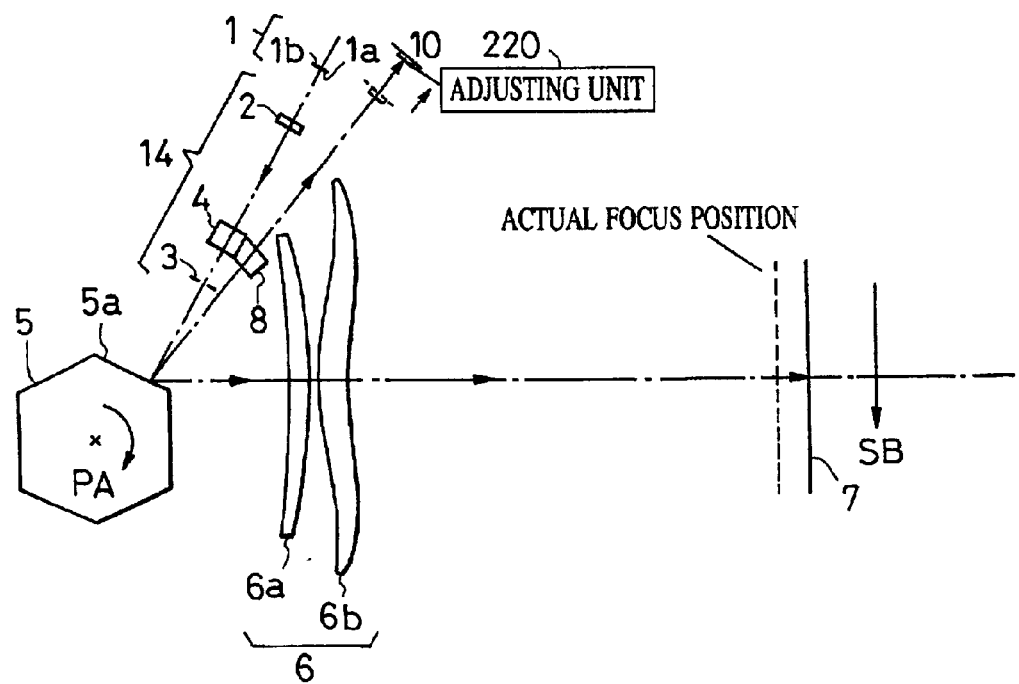
FIG. 14 is a sectional view of an eighth embodiment of the present invention in the main scan direction.
Figure 15:
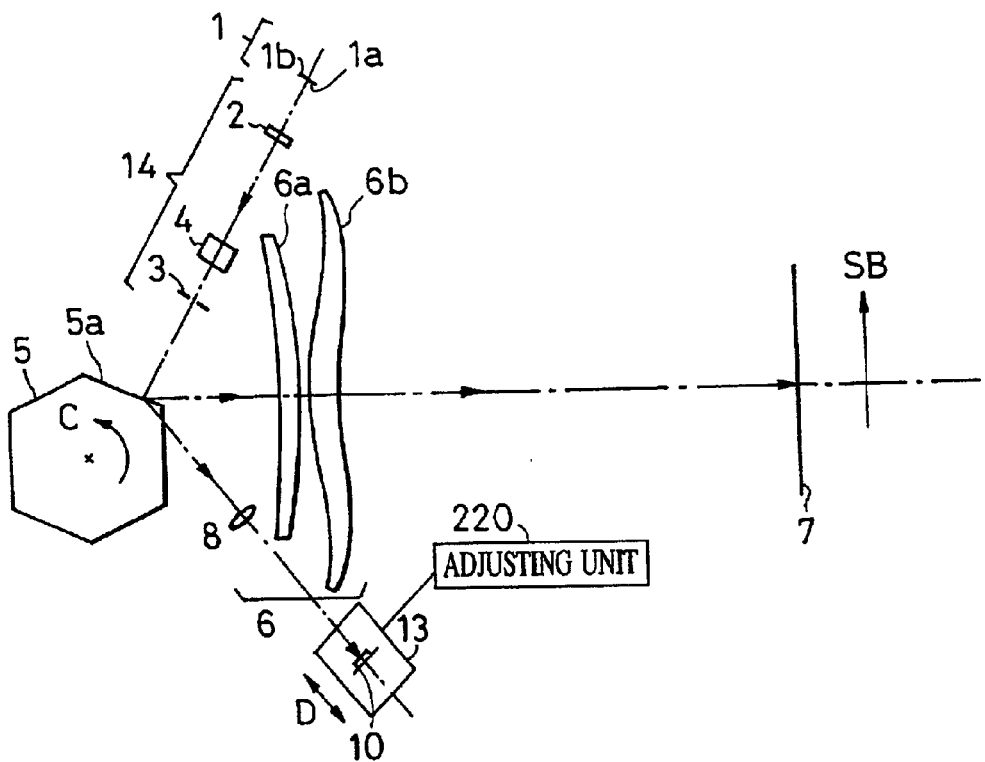
FIG. 15 is a sectional view of a ninth embodiment of the present invention in the main scan direction.
Figure 16:
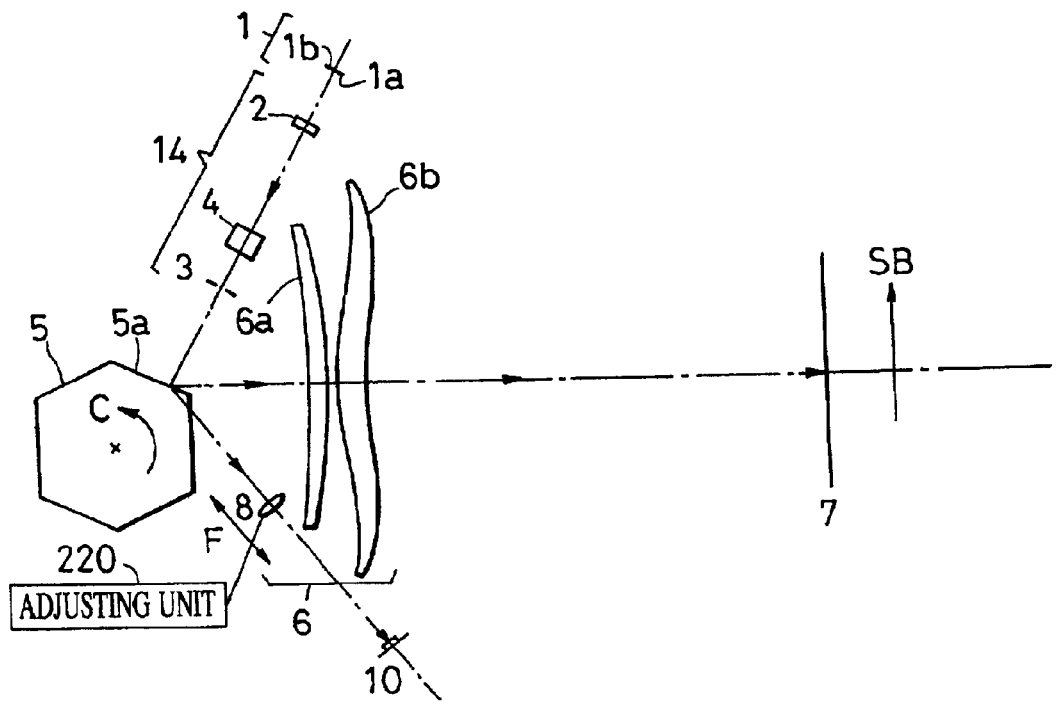
FIG. 16 is a sectional view of a tenth embodiment of the present invention in the main scan direction.

FIG. 11 is a sectional view (main scan section view) of principal part of a multi-beam scanning optical system according to a sixth embodiment of the present invention in the main scan direction, and FIGS. 12A to 12C are each a perspective view showing principal part of a BD slit 9 shown in FIG. 11. Note that, in FIGS. 11 and 12A to 12C, the same components as those shown in FIG. 7 are denoted by the same reference numerals.

This sixth embodiment differs from the fifth embodiment in that any angle adjusting unit is provided and the dot position shift is compensated (canceled) by inclining the BD slit 9 or a unit 16 including the BD slit 9 in the sub-scan direction beforehand depending on the dot position shift amount of each scanning line on the surface to be scanned. The other arrangement and optical action are substantially the same as those in the fifth embodiment, whereby similar advantages are also obtained.

More specifically, in the case in which the degree of an image plane curvature due to the scanning optical system 6 is fairly stable for each product and the left side ($|(Fb/Ff) \times \delta X - (Ff/Fb) \times \delta M1|$) of the above conditional formula (A) has a non-negligible value when the BD slit 9 is arranged in the focus position, the dot position shift is compensated (canceled) by inclining the BD slit 9 in the sub-scan direction beforehand, as shown in FIGS. 11 and 12, depending on the dot position shift amount of each scanning line on the surface to be scanned. As a result, high-quality printing at high speed is realized.

[Seventh, Eighth, Ninth and Tenth Embodiments]

FIGS. 13, 14, 15 and 16 are sectional views (main scan section views) of principal parts of multi-beam scanning optical systems according to a seventh, eighth, ninth and tenth embodiments of the present invention in the main scan direction, respectively. Note that, in FIGS. 13, 14, 15 and 16, the same components as those shown in FIGS. 1, 3, 5 and 6 are denoted by the same reference numerals.

The seventh embodiment corresponds to the first embodiment, the eighth embodiment corresponds to the second embodiment, the ninth embodiment corresponds to the third embodiment, and the tenth embodiment corresponds to the fourth embodiment, respectively. The seventh, eighth, ninth and tenth embodiments differ in common from the first, second, third and fourth embodiments in that each multi-beam scanning optical system is constructed without using the BD slit 9 for simplification of the overall system arrangement and reduction of the cost. The other arrangement and optical action are substantially the same as those in corresponding one of the first, second, third and fourth embodiments, whereby similar advantages are also obtained.

More specifically, in the seventh, eighth, ninth and tenth embodiments, an effective end of the BD sensor 10 acts equivalently to the BD slit 9 in the corresponding first, second, third and fourth embodiments. In the seventh, eighth, ninth and tenth embodiments, therefore, the above-described adjustment made in the corresponding first, second, third and fourth embodiments is performed basically in the same manner except that the light receiving surface of the BD sensor 10 is substituted for the plane of the BD slit 9. Hence, similar advantages to those in the corresponding embodiments are obtained.

In the seventh, eighth, ninth and tenth embodiments, assuming that the focus position shift amount of each light beam introduced to the BD sensor 10 in the main scan section is δM2 looking from the light receiving surface of the BD sensor 10, the focus position shift amount of each image height is δX looking from the surface to be scanned, the allowable dot position shift amount of each scanning line is δmax, and the maximum angle difference between the incident angles of the light beams upon the light receiving surface of the BD sensor 10 is θmax, the various factors are set so as to satisfy the following conditional formula (B) while Ff≠Fb holds:

$$|(Fb/Ff) \times \delta X - (Ff/Fb) \times \delta M2| \leq \delta Y \max/\theta \max \quad (B)$$

Thus, according to the seventh, eighth, ninth and tenth embodiments, since each multi-beam scanning optical system is constructed without using the BD slit, high-quality printing at high speed is realized with a relatively simple construction while simplification of the overall system arrangement and reduction of the cost are achieved.

[Image Forming Apparatus]

Figure 17:
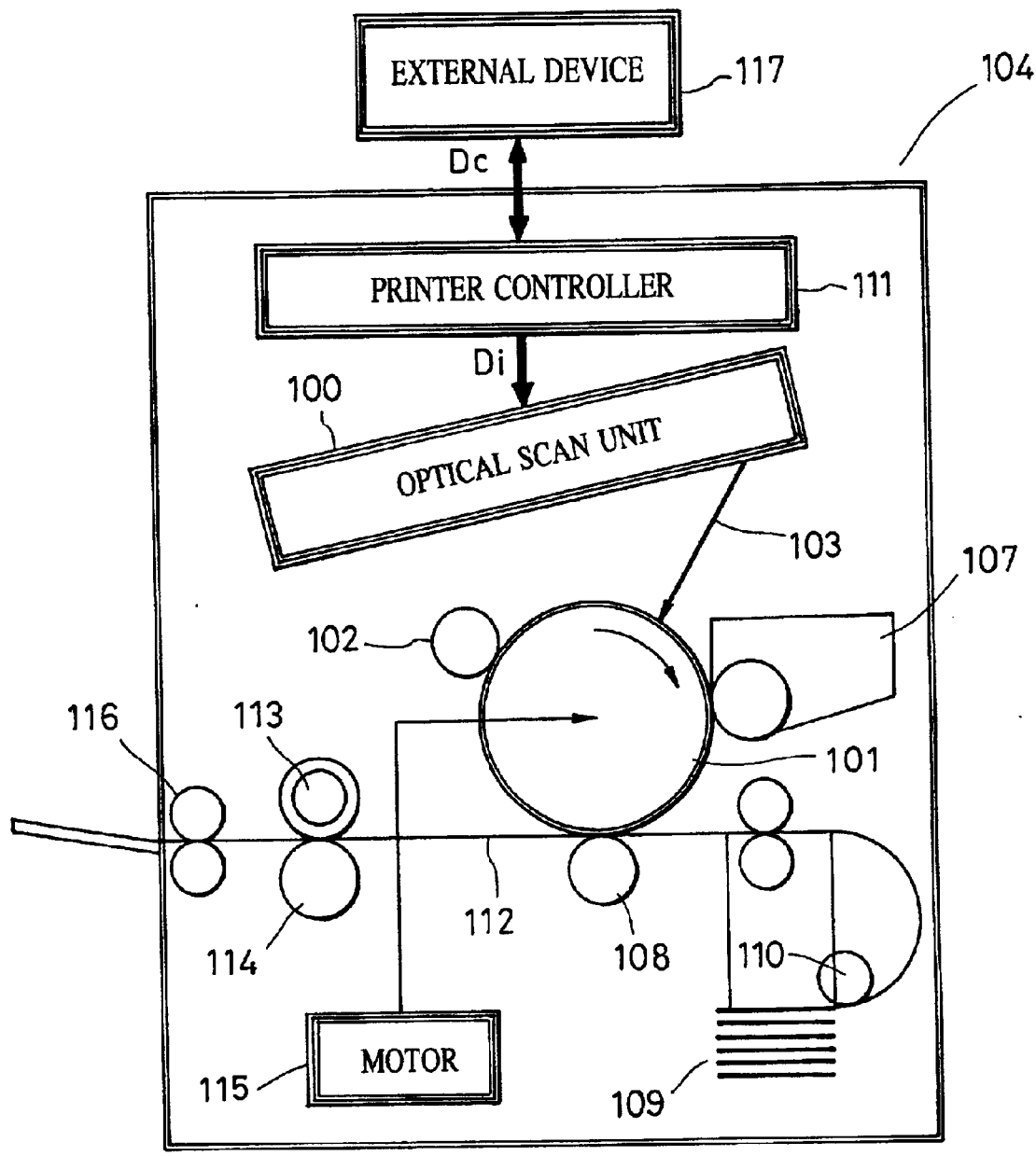
FIG. 17 is a sectional view, in the sub-scan direction, showing one example of a construction of principal part of an image forming apparatus (electrophotographic printer) using an optical scanning device of the present invention.
Figure 18:
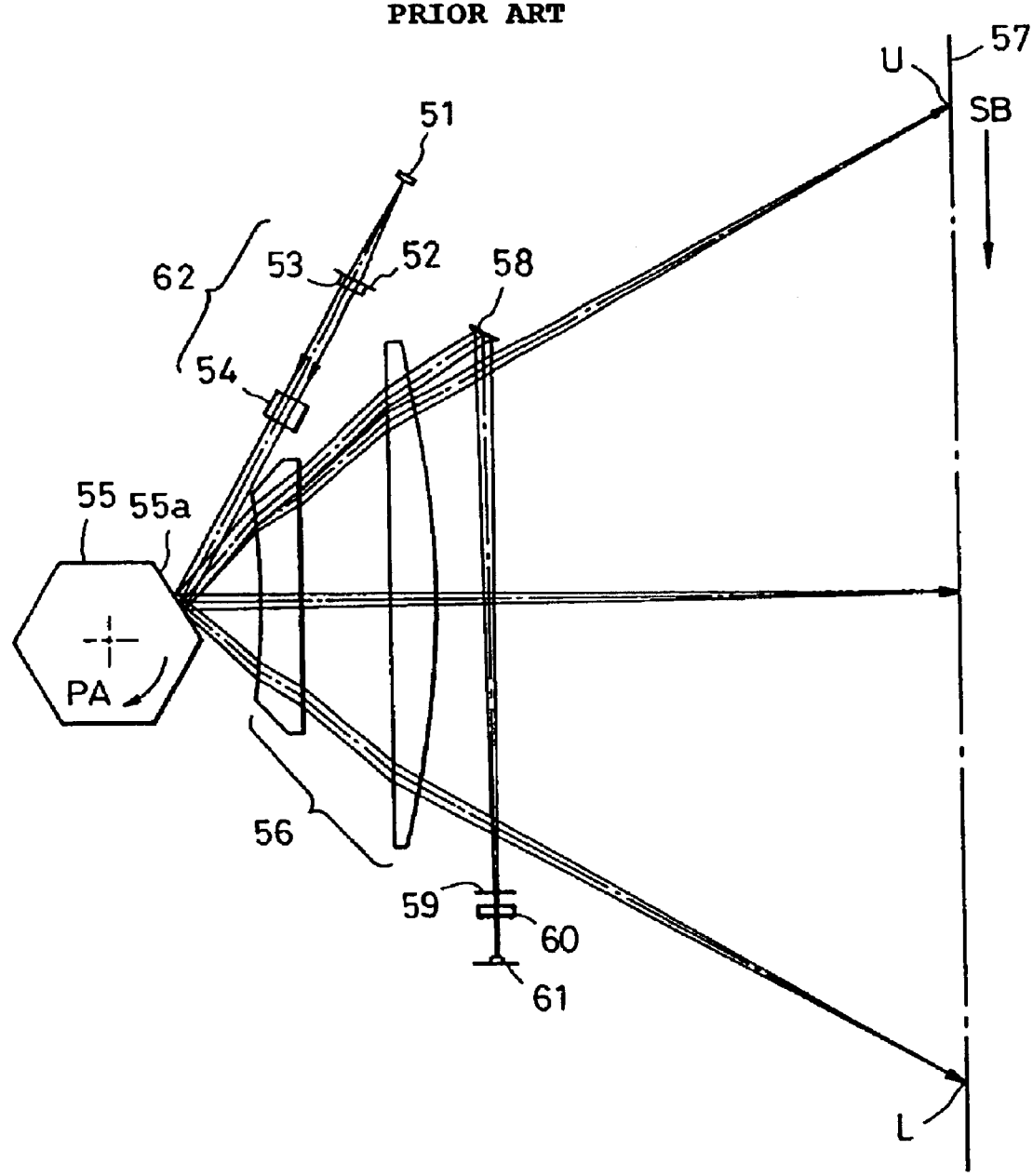
FIG. 18 is a sectional view of a conventional multi-beam scanning optical system in the main scan direction.
Figures 21A, 21B:
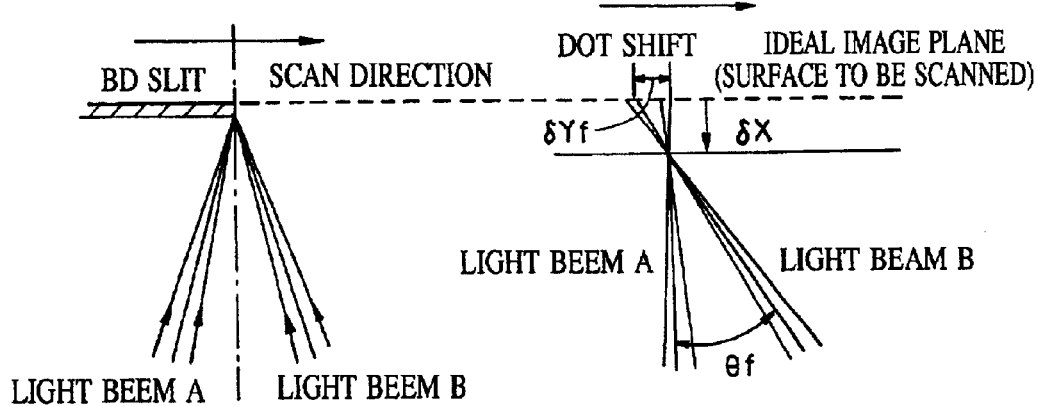
FIGS. 21A and 21B are explanatory views showing the positional relationship between two light beams when the focus position is shifted to the upstream side (the side nearer to the deflecting unit) with respect to a surface to be scanned.
Figures 22A, 22B:
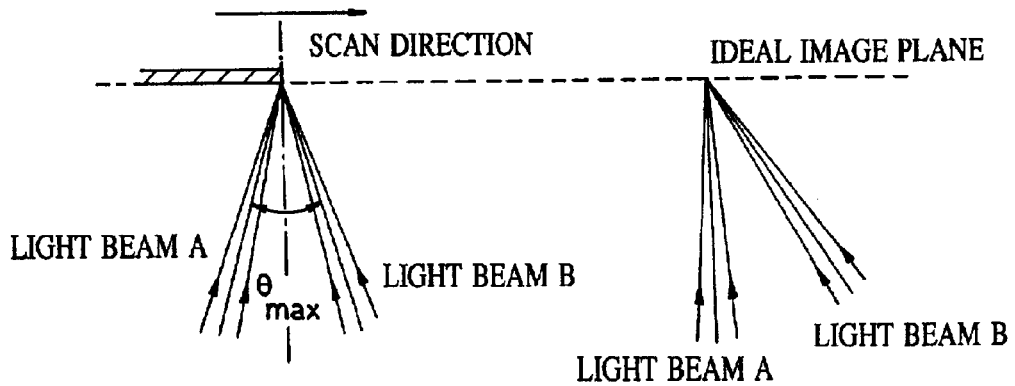
FIGS. 22A and 22B are explanatory views showing the positional relationship between two light beams when the focus position is not shifted.

FIG. 17 is a sectional view, in the sub-scan direction, showing a construction of principal part of one example of an image forming apparatus (electrophotographic printer) using the multi-beam scanning optical system according to any of the above-described first to tenth embodiments. In FIG. 17, numeral 104 denotes an image forming apparatus. The image forming apparatus 104 receives code data Dc from an external device 117 such as a personal computer. The code data Dc is converted into image data (dot data) Di by a printer controller 111 incorporated in the apparatus. The image data Di is inputted to an optical scanning unit (multi-beam scanning optical system) 100 according to any of the above-described first to tenth embodiments. The optical scanning unit 100 emits a light beam 103 modulated in accordance with the image data Di, and a photoconductive surface of a photoconductor drum 101 is scanned with the modulated light beam 103.

The photoconductor drum 101 serving as an electrostatic latent image carrier (photoconductor) is rotated clockwise by a motor 115. With the rotation of the photoconductor drum 101, the photoconductive surface thereof is moved relative to the light beam 103 in the sub-scan direction perpendicular to the main scan direction. Above the photoconductor drum 101, a charging roller 102 is provided in contact with the photoconductive surface of the photoconductor drum 101 so that the drum surface is uniformly charged. Then, the light beam 103 scanned by the optical scanning unit 100 is illuminated onto the surface of the photoconductor drum 101 that has been charged by the charging roller 102.

The light beam 103 is modulated in accordance with the image data Di, as described above, and an electrostatic latent image is formed on the surface of the photoconductor drum 101 upon illumination of the light beam 103. The electrostatic latent image is developed into a toner image by a developing unit 107 that is disposed in contact with the photoconductor drum 101 at a position downstream of the illumination position of the light beam 103 in the rotating direction of the photoconductor drum 101.

The toner image developed by the developing unit 107 is transferred onto a sheet of paper 112, as a material to which the toner image is to be transferred, by a transfer roller (transfer unit) 108 that is disposed under the photoconductor drum 101 in an opposed relation to it. The sheet of paper 112 is stored in a sheet cassette 109 disposed on the front side (right side in FIG. 17) of the photoconductor drum 101, but it may be manually fed. A sheet feed roller 110 is disposed at an end of the sheet cassette 109 to feed the sheets of paper 112 stacked in the sheet cassette 109 one by one.

The sheet of paper 112 including a toner image having been transferred onto it but not yet fused is further fed to a fusing unit disposed on the rear side (left side in FIG. 17) of the photoconductor drum 101. The fusing unit comprises a fusing roller 113 having a built-in fusing heater (not shown) and a pressing roller 114 disposed in pressure contact with the fusing roller 113. The sheet of paper 112 fed from a transfer station is heated while it is pressed in a nip area between the fusing roller 113 and the pressing roller 114, whereby the not-yet-fused toner image on the sheet of paper 112 is fused. Further, a sheet ejection roller 116 is disposed on the rear side of the fusing roller 113 to eject the sheet of paper 112 including the toner image fused on it to the exterior of the image forming apparatus.

Though not illustrated in FIG. 17, the printer controller 111 executes not only conversion of data as described above, but also control of various components of the image forming apparatus, such as the motor 115, a polygon mirror motor in the optical scanning unit 100, and so on.

According to the present invention, as described above, assuming that the focus position shift amount of each light beam introduced to the synchronous detection sensor in the main scan section is δM looking from the BD slit (light receiving surface of the synchronous detection sensor in the case of not including the BD slit), and the focus position shift amount of each image height is δX looking from the surface to be scanned, the various factors are set so that the focus position shift mounts δM and δX satisfy the conditional formula (A) (conditional formula (B) in the case of not including the BD slit). As a result, a multi-beam scanning optical system and an image forming apparatus using the same are achieved which can realize high-quality printing at high speed with a relatively simple construction.

Also, according to the present invention, a dot position shift is compensated by a compensating unit, the dot position shift being attributable to the fact that the left side of the conditional formula (A) (conditional formula (B) in the case of not including the BD slit) has a certain value due to the presence of the focus position shift amount δM of each light beam introduced to the synchronous detection sensor in the main scan section looking from the BD slit (light receiving surface of the synchronous detection sensor in the case of not including the BD slit), and the focus position shift amount δX of each image height looking from the surface to be scanned. As a result, a multi-beam scanning optical system and an image forming apparatus using the same are achieved which can similarly realize high-quality printing at high speed with a relatively simple construction.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A multi-beam scanning optical system comprising entrance optical means for introducing, to deflecting means, a plurality of light beams emitted from light source means having a plurality of light emitting portions arranged apart from each other at least in a main scan direction; scanning optical means for focusing the plurality of light beams deflected by said deflecting means on a surface to be scanned; and synchronous detection optical means for converging, by a synchronous detection optical element, parts of the plurality of light beams deflected by said deflecting means on a plane of a slit, introducing the parts of the plurality of light beams to a synchronous detection sensor, and controlling timing of scan start positions on said surface to be scanned with respect to the plurality of light beams by using signals from said synchronous detection sensor, wherein, assuming that a focal distance of said scanning optical means is Ff, a focal distance of said synchronous detection optical element is Fb, a focus position shift amount of each light beam introduced to said synchronous detection sensor in a main scan section is δM1 looking from said slit, a focus position shift amount of each image height is δX looking from said surface to be scanned, an allowable dot position shift amount of each scanning line is δYmax, and a maximum angle difference between incident angles of the light beams upon the slit plane is θmax, Ff≠Fb holds and the following conditional formula is satisfied:

$$|(Fb/Ff) \times \delta X - (Ff/Fb) \times \delta M1| \leq \delta M1| \leq \delta Ymax/\theta max, \text{ and}$$

wherein said allowable dot position shift amount of each scanning line is not larger than ½ of resolution in a sub-scan direction.

2. A multi-beam scanning optical system according to claim 1, further comprising first compensating means for shifting a focus position, in the main scan section, of each light beam introduced to said synchronous detection sensor in a direction of an optical axis of said synchronous detection optical means relative to said slit.

3. A multi-beam scanning optical system according to claim 2, wherein said multi-beam scanning optical system includes second compensating means for shifting a position of said slit or a unit including said slit in the direction of the optical axis of said synchronous detection optical means.

4. A multi-beam scanning optical system according to claim 2, wherein said synchronous detection optical element is disposed in an optical path between said deflecting means and said slit, and includes third compensating means for shifting at least one lens of said synchronous detection optical element in the direction of the optical axis of said synchronous detection optical means.

5. A multi-beam scanning optical system according to claim 1, wherein said synchronous detection optical element comprises a single lens and is formed integrally with a part of optical elements constituting said entrance optical means.

6. A multi-beam scanning optical system comprising entrance optical means for introducing, to deflecting means, a plurality of light beams emitted from light source means having a plurality of light emitting portions arranged apart from each other at least in a main scan direction; scanning optical means for focusing the plurality of light beams deflected by said deflecting means on a surface to be scanned; and synchronous detection optical means for converging, by a synchronous detection optical element, parts of the plurality of light beams deflected by said deflecting means on a plane of a slit, introducing the parts of the plurality of light beams to a synchronous detection sensor, and controlling timing of scan start positions on said surface to be scanned with respect to the plurality of light beams by using signals from said synchronous detection sensor, wherein said multi-beam scanning optical system further comprises fourth compensating means for compensating a dot position shift of each scanning line on said surface to be scanned, the dot position shift being caused by the fact that, assuming that a focal distance of said scanning optical means is Ff, a focal distance of said synchronous detection optical element is Fb, a focus position shift amount of each light beam introduced to said synchronous detection sensor in a main scan section is δM1 looking from said slit, and a focus position shift amount of each image height is δX looking from said surface to be scanned, Ff≠Fb holds and $|(Fb/Ff) \times \delta X - (Ff/Fb) \times \delta M1|$ has a certain value; and wherein a dot position shift amount of each scanning line on said surface to be scanned is not larger than ½ of resolution in a sub-scan direction.

7. A multi-beam scanning optical system according to claim 6, further comprising fifth compensating means for shifting a focus position, in the main scan section, of each light beam introduced to said synchronous detection sensor in a direction of an optical axis of said synchronous detection optical means relative to said slit.

8. A multi-beam scanning optical system according to claim 7, wherein said multi-beam scanning optical system includes sixth compensating means for shifting a position of said slit or a unit including said slit in the direction of the optical axis of said synchronous detection optical means.

9. A multi-beam scanning optical system according to claim 7, wherein said synchronous detection optical element is disposed in an optical path between said deflecting means and said slit, and includes seventh compensating means for shifting at least one lens of said synchronous detection optical element in the direction of the optical axis of said synchronous detection optical means.

10. A multi-beam scanning optical system according to claim 6, wherein said plurality of light emitting portions are arranged apart from each other in the sub-scan direction.

11. A multi-beam scanning optical system according to claim 10, wherein said slit or a unit including said slit is inclined in the sub-scan direction depending on the dot position shift amount of each scanning line on said surface to be scanned.

12. A multi-beam scanning optical system according to claim 10, wherein said fourth compensating means has angle adjusting means rotating said slit or a unit including said slit about the optical axis of said synchronous detection optical means depending on the dot position shift amount of each scanning line on said surface to be scanned.

13. A multi-beam scanning optical system according to claim 6, wherein the certain value is an unacceptably high value, and said fourth compensating means compensates dot position shift so that $|(Fb/Ff) \times \delta X - (Ff/Fb) \times \delta M1|$ has a value less than or equal to δYmax/θmax, wherein δYmax is an allowable dot position shift amount of each scanning line, and θmax is a maximum angle difference between incident angles of the light beams upon the slit plane.

14. A multi-beam scanning optical system comprising entrance optical means for introducing, to deflecting means, a plurality of light beams emitted from light source means having a plurality of light emitting portions arranged apart from each other at least in a main scan direction; scanning optical means for focusing the plurality of light beams deflected by said deflecting means on a surface to be scanned; and synchronous detection optical means for introducing, by a synchronous detection optical element, parts of the plurality of light beams deflected by said deflecting means to a synchronous detection sensor and controlling timing of scan start positions on said surface to be scanned with respect to the plurality of light beams by using signals from said synchronous detection sensor, wherein, assuming that a focal distance of said scanning optical means is Ff, a focal distance of said synchronous detection optical element is Fb, a focus position shift amount of each light beam introduced to said synchronous detection sensor in a main scan section is δM2 looking from a light receiving surface of said synchronous detection sensor, a focus position shift amount of each image height is δX looking from said surface to be scanned, an allowable dot position shift amount of each scanning line is δYmax, and a maximum angle difference between incident angles of the light beams upon the light receiving surface of said synchronous detection sensor is θmax, Ff≠Fb holds and the following conditional formula is satisfied:

$$|(Fb/Ff) \times \delta X - (Ff/Fb) \times \delta M2| \leq \delta Ymax/\theta max, \text{ and}$$

wherein said allowable dot position shift amount of each scanning line is not larger than ½ of resolution in a sub-scan direction.

15. A multi-beam scanning optical system according to claim 14, further comprising first compensating means for shifting a focus position, in the main scan section, of each light beam introduced to said synchronous detection sensor in a direction of an optical axis of said synchronous detection optical means relative to the light receiving surface of said synchronous detection sensor.

16. A multi-beam scanning optical system according to claim 15, wherein said multi-beam scanning optical system includes second compensating means for shifting a position of said synchronous detection sensor or a unit including said synchronous detection sensor in the direction of the optical axis of said synchronous detection optical means.

17. A multi-beam scanning optical system according to claim 15, wherein said synchronous detection optical element is disposed in an optical path between said deflecting means and said synchronous detection sensor, and includes third compensating means for shifting at least one lens of said synchronous detection optical element in the direction of the optical axis of said synchronous detection optical means.

18. A multi-beam scanning optical system according to claim 14, wherein said synchronous detection optical element comprises a single lens and is formed integrally with a part of optical elements constituting said entrance optical means.

19. A multi-beam scanning optical system comprising entrance optical means for introducing, to deflecting means, a plurality of light beams emitted from light source means having a plurality of light emitting portions arranged apart from each other at least in a main scan direction; scanning optical means for focusing the plurality of light beams deflected by said deflecting means on a surface to be scanned; and synchronous detection optical means for introducing, by a synchronous detection optical element, parts of the plurality of light beams deflected by said deflecting means to a synchronous detection sensor and controlling timing of scan start positions on said surface to be scanned with respect to the plurality of light beams by using signals from said synchronous detection sensor, wherein said multi-beam scanning optical system further comprises fourth compensating means for compensating a dot position shift of each scanning line on said surface to be scanned, the dot position shift being caused by the fact that, assuming that a focal distance of said scanning optical means is Ff, a focal distance of said synchronous detection optical element is Fb, a focus position shift amount of each light beam introduced to said synchronous detection sensor in a main scan section is δM2 looking from a light receiving surface of said synchronous detection sensor, and a focus position shift amount of each image height is δX looking from said surface to be scanned, Ff≠Fb holds and |(Fb/Ff)×δX−(Ff/Fb)×δM2| has a certain value, and wherein a dot position shift amount of each scanning line on said surface to be scanned is not larger than ½ of resolution in a sub-scan direction.

20. A multi-beam scanning optical system according to claim 19, wherein said plurality of light emitting portions are arranged apart from each other in the sub-scan direction.

21. A multi-beam scanning optical system according to claim 19, further comprising fifth compensating means for shifting a focus position, in the main scan section, of each light beam introduced to said synchronous detection sensor in a direction of an optical axis of said synchronous detection optical means relative to the light receiving surface of said synchronous detection sensor.

22. A multi-beam scanning optical system according to claim 21, wherein said multi-beam scanning optical system includes sixth compensating means for shifting a position of said synchronous detection sensor or a unit including said synchronous detection sensor in the direction of the optical axis of said synchronous detection optical means.

23. A multi-beam scanning optical system according to claim 21, wherein said synchronous detection optical element is disposed in an optical path between said deflecting means and said synchronous detection sensor, and includes seventh compensating means for shifting at least one lens of said synchronous detection optical element in the direction of the optical axis of said synchronous detection optical means.

24. A multi-beam scanning optical system according to claim 19, wherein the certain value is an unacceptably high value, and said fourth compensating means compensates dot position shift so that |(Fb/Ff)×δX−(Ff/Fb)×δM1| has a value less than or equal to δYmax/θmax, wherein δYmax is an allowable dot position shift amount of each scanning line, and θmax is a maximum angle difference between incident angles of the light beams upon the slit plane.

25. A multi-beam scanning optical system comprising entrance optical means for introducing, to deflecting means, a plurality of light beams emitted from light source means having a plurality of light emitting portions arranged apart from each other at least in a main scan direction; scanning optical means for focusing the plurality of light beams deflected by said deflecting means on a surface to be scanned; and synchronous detection optical means for converging, by a synchronous detection optical element, parts of the plurality of light beams deflected by said deflecting means on a plane of a slit, introducing the parts of the plurality of light beams to a synchronous detection sensor, and controlling timing of scan start positions on said surface to be scanned with respect to the plurality of light beams by using signals from said synchronous detection sensor, wherein an amount of dot position shift of each scanning line on said surface to be scanned is not larger than ½ of resolution in a sub-scan direction, the dot position shift being caused by the fact that, assuming that a focal distance of said scanning optical means is Ff, a focal distance of said synchronous detection optical element is Fb, a focus position shift amount of each light beam introduced to said synchronous detection sensor in a main scan section is $\delta M1$ looking from said slit, and a focus position shift amount of each image height is $\delta X$ looking from said surface to be scanned, Ff≠Fb holds and $|(Fb/Ff) \times \delta X - (Ff/Fb) \times \delta M1|$ has a certain value.

26. A multi-beam scanning optical system comprising entrance optical means for introducing, to deflecting means, a plurality of light beams emitted from light source means having a plurality of light emitting portions arranged apart from each other at least in a main scan direction; scanning optical means for focusing the plurality of light beams deflected by said deflecting means on a surface to be scanned; and synchronous detection optical means for introducing, by a synchronous detection optical element, parts of the plurality of light beams deflected by said deflecting means to a synchronous detection sensor and controlling timing of scan start positions on said surface to be scanned with respect to the plurality of light beams by using signals from said synchronous detection sensor, wherein an amount of dot position shift of each scanning line on said surface to be scanned is not larger than ½ of resolution in a sub-scan direction, the dot position shift being caused by the fact that, assuming that a focal distance of said scanning optical means is Ff, a focal distance of said synchronous detection optical element is Fb, a focus position shift amount of each light beam introduced to said synchronous detection sensor in a main scan section is $\delta M2$ looking from a light receiving surface of said synchronous detection sensor, and a focus position shift amount of each image height is $\delta X$ looking from said surface to be scanned, Ff≠Fb holds and $|(Fb/Ff) \times \delta X - (Ff/Fb) \times \delta M2|$ has a certain value.

27. An image forming apparatus comprising:
a multi-beam scanning optical system according to any one of claims 1, 2 to 6, 7 to 14, 15 to 19, and 20 to 26;
a photoconductor arranged on a surface to be scanned;
a developing unit for developing, into a toner image, an electrostatic latent image formed on said photoconductor by light beams scanned by said multi-beam scanning optical system;
a transfer unit for transferring the developed toner image onto a material to which the toner image is to be transferred; and
a fusing unit for fusing the transferred toner image onto said material to which the toner image is to be transferred.

28. An image forming apparatus comprising;
a multi-beam scanning optical system according to one of claims 1, 2 to 6, 7 to 14, 15 to 19, and 20 to 26; and
a printer controller for converting code data inputted from an external device into an image signal and applying the image signal to said beam scanning optical system.

* * * * *

UNITED STATES PATENT AND TRADEMARK OFFICE
CERTIFICATE OF CORRECTION

PATENT NO.    : 6,833,855 B2
DATED         : December 21, 2004
INVENTOR(S)   : Hiroki Yoshida It is certified that error appears in the above-identified patent and that said Letters Patent is hereby corrected as shown below:

Column 9,
Line 28, "$|(Fb/Ff) \times X - (Ff/Fb) \times \delta M2| \leq \delta Y \max/\theta \max$" should read
-- $|(Fb/Ff) \times \delta X - |(Ff/Ff) \times \delta M2| \leq \delta Y \max/\theta \max$ --.

Column 21,
Line 13, "$\delta\max$" should read -- $\delta Y\max$ --.

Signed and Sealed this

Nineteenth Day of July, 2005

JON W. DUDAS
*Director of the United States Patent and Trademark Office*